US011707942B2

(12) United States Patent
Finnerty et al.

(10) Patent No.: US 11,707,942 B2
(45) Date of Patent: *Jul. 25, 2023

(54) INSTANT TICKET REDUNDANCY VIA MULTI-CHROMATIC INDICIA

(71) Applicant: HYDRAGRAPHIX LLC, Providence, RI (US)

(72) Inventors: Fred W. Finnerty, Dawsonville, GA (US); Kenneth E. Irwin, Jr., Dawsonville, GA (US)

(73) Assignee: Hydragraphix LLC, Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/457,973

(22) Filed: Dec. 7, 2021

(65) Prior Publication Data

US 2022/0161584 A1 May 26, 2022

Related U.S. Application Data

(63) Continuation of application No. 16/929,496, filed on Jul. 15, 2020, now Pat. No. 11,203,218, which is a
(Continued)

(51) Int. Cl.
*B41M 3/14* (2006.01)
*C09D 11/40* (2014.01)
(Continued)

(52) U.S. Cl.
CPC .............. *B41M 3/14* (2013.01); *B41J 2/2139* (2013.01); *B41M 1/14* (2013.01); *B42D 15/025* (2013.01);
(Continued)

(58) Field of Classification Search
CPC ........... B41M 3/14; B41M 1/14; B42D 25/27; B42D 15/025; B41J 2/2139; C09D 11/40; G03G 21/043
(Continued)

(56) References Cited

U.S. PATENT DOCUMENTS

| 4,677,553 A | 6/1987 | Roberts et al. |
| 4,725,079 A | 2/1988 | Koza et al. |

(Continued)

FOREIGN PATENT DOCUMENTS

| CN | 101384309 A | 3/2009 |
| CN | 102844198 A | 12/2012 |

(Continued)

OTHER PUBLICATIONS

"Communication pursuant to Article 94(3) EPC", Corresponding European Application No. 16791174.2, dated May 14, 2019.
(Continued)

*Primary Examiner* — Edwyn Labaze
(74) *Attorney, Agent, or Firm* — Neal, Gerber & Eisenberg LLP

(57) ABSTRACT

A redundantly printed security-enhanced document, printing method and system ensure the meaning of the information imparted by variable indicia printed by redundant printing on the document with removable scratch-off coatings. By printing the variable indicia with multiple colors, redundancy and integrity of the intended indicia is achieved. Additionally, inverted color indicia countermeasures to pin-prick attacks are also disclosed. The redundantly printed document, methods and systems enhance the overall appearance of the redundantly printed document, and reduce possible consequences resulting from misprinted variable indicia. The resultant printed process color indicia maintains a grayscale equivalent level of a process color greater than or
(Continued)

equal to the measured grayscale equivalent level of the substrate surface plus an additional contrast delta of 15%.

**20 Claims, 21 Drawing Sheets
(15 of 21 Drawing Sheet(s) Filed in Color)**

Related U.S. Application Data continuation of application No. 16/537,958, filed on Aug. 12, 2019, now Pat. No. 10,752,035, which is a continuation of application No. 16/250,510, filed on Jan. 17, 2019, now Pat. No. 10,377,162, which is a continuation-in-part of application No. 15/792,898, filed on Oct. 25, 2017, now Pat. No. 10,252,555, which is a continuation-in-part of application No. 15/152,817, filed on May 12, 2016, now Pat. No. 10,232,247.

(60) Provisional application No. 62/243,384, filed on Oct. 19, 2015.

(51) Int. Cl.
  *B42D 15/02* (2006.01)
  *B41M 1/14* (2006.01)
  *B42D 25/27* (2014.01)
  *G03G 21/04* (2006.01)
  *B41J 2/21* (2006.01)

(52) U.S. Cl.
  CPC .............. *B42D 25/27* (2014.10); *C09D 11/40* (2013.01); *G03G 21/043* (2013.01)

(58) Field of Classification Search
  USPC ............................ 283/72; 235/487, 380, 375
  See application file for complete search history.

(56) References Cited

U.S. PATENT DOCUMENTS

| | | | |
|---|---|---|---|
| 5,268,992 A | 12/1993 | Sasaki | |
| 5,542,710 A | 8/1996 | Silverschotz et al. | |
| 5,601,887 A | 2/1997 | Rich et al. | |
| 5,681,065 A | 10/1997 | Rua et al. | |
| 5,704,647 A | 1/1998 | Desbiens | |
| 5,752,152 A | 5/1998 | Gasper et al. | |
| 5,803,504 A | 9/1998 | Desbiens et al. | |
| 6,097,497 A | 8/2000 | McGraw | |
| 6,155,491 A | 12/2000 | Dueker et al. | |
| 6,325,420 B1 | 12/2001 | Zhang et al. | |
| 6,330,685 B1 | 12/2001 | Hao et al. | |
| 6,354,630 B1 | 3/2002 | Zhang et al. | |
| 6,379,742 B1 | 4/2002 | Behm et al. | |
| 6,405,929 B1 | 6/2002 | Ehrhart et al. | |
| 6,493,597 B1 | 12/2002 | Linares et al. | |
| 6,650,946 B2 | 11/2003 | Bauer | |
| 6,694,043 B2 | 2/2004 | Seder et al. | |
| 6,733,194 B2 | 5/2004 | Schilling et al. | |
| 6,739,245 B2 | 5/2004 | Schilling et al. | |
| 6,768,558 B1 | 7/2004 | Yamashita et al. | |
| 7,665,400 B2 | 2/2010 | Duke | |
| 8,342,576 B2 | 1/2013 | Eschbach et al. | |
| 8,539,883 B2 | 9/2013 | Reckefuss et al. | |
| 8,619,278 B2 | 12/2013 | Kojima et al. | |
| 10,130,869 B2 | 11/2018 | Finnerty et al. | |
| 2003/0173406 A1 | 9/2003 | Bi et al. | |
| 2003/0193684 A1 | 10/2003 | Kendall et al. | |
| 2004/0061326 A1 | 4/2004 | Hilton et al. | |
| 2005/0161512 A1* | 7/2005 | Jones ................ | H04N 1/32133 235/487 |
| 2006/0017758 A1 | 1/2006 | Nambudiri et al. | |
| 2006/0157559 A1 | 7/2006 | Levy et al. | |
| 2007/0016790 A1 | 1/2007 | Brundage et al. | |
| 2008/0013848 A1 | 1/2008 | Wu et al. | |
| 2008/0149713 A1 | 6/2008 | Brundage | |
| 2008/0302263 A1 | 12/2008 | Eschbach et al. | |
| 2009/0207433 A1* | 8/2009 | Wang .................... | G06F 40/109 358/1.11 |
| 2010/0139512 A1 | 6/2010 | Reckefuss et al. | |
| 2010/0187293 A1* | 7/2010 | Mehta .................. | B42D 15/042 229/92.8 |
| 2010/0253063 A1 | 10/2010 | Skogster | |
| 2011/0116681 A1* | 5/2011 | Simske ................ | G07D 7/2016 358/3.27 |
| 2011/0126729 A1 | 6/2011 | Morono et al. | |
| 2011/0134458 A1 | 6/2011 | Kojima et al. | |
| 2012/0025516 A1 | 2/2012 | Miller et al. | |
| 2012/0145024 A1 | 6/2012 | Scrymgeour et al. | |
| 2012/0267888 A1 | 10/2012 | Behm et al. | |
| 2017/0106271 A1 | 4/2017 | Finnerty et al. | |
| 2018/0099521 A1* | 4/2018 | Wu ....................... | B42D 25/309 |
| 2018/0370266 A1 | 12/2018 | Finnerty | |

FOREIGN PATENT DOCUMENTS

| | | | | |
|---|---|---|---|---|
| CN | 104859329 A | 8/2015 | | |
| CN | 108883339 A | 11/2018 | | |
| EP | 2078613 A2 * | 7/2009 | ............ | B41J 2/2114 |
| EP | 2918424 A1 | 9/2015 | | |

OTHER PUBLICATIONS

"Extended European Search Report", from corresponding European Patent Application No. 18870518.0 (7 pages), dated Jul. 27, 2021.
"First Chinese Office Action", Corresponding Chinese Application No. 201680074633.4, dated Apr. 18, 2019.
"Florida Lottery refuses to pay winning prize", Associated Press, http://www.nbcnews.com/id/18728793/ns/us_news-weird_news/t/florida-lottery-refuses-pay-winning-prize/#.WDHYNHeZOEI <http://www.nbcnews.com/id/18728793/ns/us_news-weird_news/t/florida-lottery-refuses-pay-winning-prize/>, May 1, 2007.
"International Preliminary Report on Patentability", PCT/US2018/038280, dated Nov. 15, 2019.
"International Preliminary Report on Patentability", PCT/US2016/057677, dated Dec. 20, 2017.
"International Preliminary Report on Patentability", PCT/US2018/038280, dated Dec. 31, 2019.
"International Search Report and Written Opinion", PCT/US2016/057677, dated Jan. 27, 2017.
"International Search Report and Written Opinion", Korean Intellectual Property Office as International Search Authority for PCT/US2020/013812 (11 pages), dated May 27, 2020.
"International Search Report and Written Opinion", PCT/US2018/038280, dated Sep. 18, 2018.
"Office Action", European Patent Application No. EP16791174.2, dated May 14, 2019.
"Search Report", Corresponding Chinese Application No. 2016800746334, dated Apr. 18, 2019.
"Second Chinese Office Action", Chinese Patent Application No. 2016800746334, dated Jan. 16, 2020.
"Second European Office Action", from corresponding European Patent Application No. 16791174.2 (4 pages), dated Oct. 8, 2020.
"Third European Office Action", from corresponding European Patent Application No. 16791174.2 (7 pages), dated Apr. 30, 2020.
"Third Office Action", Chinese Patent Application CN201680074633.4, dated Jul. 10, 2020.
"Woman sues after 'winning' $500,000 scratch-off ticket is called misprint", Nika Myers Palm, Orlando Sentinel, downloaded from webpage: <http://articles.orlandosentinel.com/2010-05-20/news/os-scratch-off-lottery-lawsuit-mispri20100520_1_gold-rush-ticket-lottery-officials-Tottery-spokeswoman-jacqueline-barreiros>, May 20, 2010.
"Written Opinion of the IPRP", PCT/US2016/057677, dated Sep. 6, 2017.

(56) References Cited

OTHER PUBLICATIONS

Burkhart, Gabrielle, "Man suing NM Lottery over $500K ticket 'misprint'", KRQE.com, <http://krqe.com/2015/02/04/man-suing-nm-lottery-over-500k-ticket-misprint>.

Evans, Sophie Jane, "Lottery refuses to pay out for retiree's $500k 'winning' lottery ticket because they say it's a Misprint," Dailymail.com.uk <http://www.dailymail.co.uk/news/article-2898283/New-Mexico-man-buys-500k-winning-lottery-ticket-officials-say-misprint-refuse-honor-it.html>, Jan. 5, 2015.

Fleming, Jameson, "New Mexico Man Told his $500K Winning Lottery Ticket was a 'misprint'", Syracuse.com, <http://www_syracuse.com/news/index.ssf/2015/01/new_mexico_man_told_his_500k_winning_lottery_ticket_was_a_misprint.html>.

Franklin, Dallas, "New Mexico man told $500,000 winning lottery ticket is a 'misprint'", NBC News, KFOR.com, <http://kfor.com/2015/01/05/new-mexico-man-told-500000-winning-lottery-ticket-is-a-misprint>.

Hijek, Barbara, "Winning $500,000 scratch-off ticket is called misprint", Sun Sentinel <http:/www.sun-sentinel.com/sfl-mtblog-2010-05-winning_500000_scratchoff_tick-story.html>.

Kipphan, "Handbook of Print Media", Springer Verlag, pp. 94 (2000), including Google machine translation of original German text, 4 pages.

Russell, Dan, "Misprinted Lottery Tickets and the Disappointment of a Non-Winning Ticket", American Gaming Layer, Autumn 2015, <https://imgl.org/sites/default/files/media/publications/misprintedlotteytickets_russel_agl_fall_2015.pdf>.

"Extended European Search Report", from corresponding European Patent Application No. 20741189.3, dated Aug. 22, 2022.

\* cited by examiner

NO CYAN

NO MAGENTA

NO YELLOW

NO BLACK billiards ball ("●")

card symbols ("K♥", "8♣", "Q♦", "A♠")

FIG. 11

INSTANT TICKET REDUNDANCY VIA MULTI-CHROMATIC INDICIA

CROSS-REFERENCE TO RELATED APPLICATIONS

This application is a continuation of U.S. patent application Ser. No. 16/929,496, filed on Jul. 15, 2020, which is a continuation of U.S. patent application Ser. No. 16/537,958, filed on Aug. 12, 2019, now U.S. Pat. No. 10,752,035, which is a continuation of U.S. patent application Ser. No. 16/250,510 filed Jan. 17, 2019, now U.S. Pat. No. 10,377,162, which is a continuation-in-part of U.S. patent application Ser. No. 15/792,898 filed Oct. 25, 2017, now U.S. Pat. No. 10,252,555, which is a continuation-in-part of U.S. patent application Ser. No. 15/152,817 filed May 12, 2016, now U.S. Pat. No. 10,232,247, and which claims the benefit of U.S. Provisional Patent Application No. 62/243,384 filed Oct. 19, 2015. The disclosures of each of these applications are hereby incorporated herein by reference in their entirety.

FIELD OF THE INVENTION

The present invention relates generally to documents, such as lottery tickets, having indicia under a Scratch-Off-Coating (SOC), and more particularly to methods for enhancing the redundancy of the documents while adding to the aesthetics of the documents.

BACKGROUND

Lottery scratch-off or instant games have become a time-honored method of raising revenue for state and federal governments the world over. Indeed, the concept of hiding indicia information under a SOC has also been applied to numerous other products such as commercial contests, telephone card account numbers, gift cards, etc. Literally, billions of scratch-off products are printed every year where the Scratch-Off-Coatings (SOCs) are used to ensure that the product has not been previously used, played, or modified.

Typically, the indicia are printed using a specialized high-speed ink jet printer or imager with a water-soluble dye. Normally, the indicia are monochromatic black or in some cases red in color, but in all cases each type of indicia is imaged as a discrete spot color.

This use of single spot color indicia imaging has repeatedly proven to be problematic with traditional spot color inkjet heads partially clogging, such that a portion of the indicia prints while other portions do not. For example, in January 2015, a Roswell, N. Mex. lottery player believed he won over $500,000 in an instant ticket key number match game. The lottery player believed that he was holding a winning ticket 100 (FIG. 1) because the key number match indicia was "1" and the lottery ticket misprint, due to clogged inkjet, made the intended indicia numbers of "18" and "13" to appeared to be two occurrences (101 and 102) of the winning key match number "1" (i.e., two $250,000 winners) with the intended second indicia digits barely appearing (101 and 102) on the ticket 100. A similar $500,000 misprint due to clogged inkjet heads occurred with the Florida Lottery (FIG. 2-110) with the ticket holders filing a lawsuit against the lottery after they were told their apparent winning ticket was a misprint. Again, in the case of the Florida Lottery, the misprinted ticket 110 displayed misprinted key match indicia 111, which when matched to game indicia 112 readily appeared to be a $500,000 winner. Indeed, there are many other documented cases (e.g., Wisconsin Lottery apparent $1,000 winning ticket) of instant ticket misprints due to clogged inkjet imager heads with some news media and attorneys claiming that the lottery or the ticket manufacturer should be forced to pay for the apparent misprinted prize value.

Some attempts to mitigate the problem of clogged lottery inkjet misprints have been attempted with the incorporation of detailed legal disclaimers, abbreviated captions of indicia, and the development of elaborate automated press monitoring systems—e.g., U.S. Pat. No. 7,665,400 (Duke). However, legal disclaimers do nothing to mitigate bad press resulting from misprinted lottery tickets and so far have not stopped lawsuits. Additionally, most players do not notice any indicia captions due to small size and abbreviated spelling—see FIG. 3 magnification of Florida ticket 110' misprinted key match indicia 113 and associated caption 114. Automated press monitoring systems, while commendable in theory, have in practice proved to be both expensive and unreliable—e.g., the previously cited New Mexico Lottery misprinted ticket 100 of FIG. 1 and Florida Lottery misprinted ticket 110 of FIG. 2 were both printed with the support of an automatic press monitoring system as disclosed in the cited Duke patent.

To date, some state jurisdictions have attempted to pass legislation forcing lotteries or their ticket providers to pay out apparent prizes on misprinted tickets with comments like: "That's a real problem because people are throwing away tickets all the time that could very well be winning tickets if these misprints are out there . . . " It is therefore highly desirable to develop techniques and methodologies for ensuring the redundancy and integrity of scratch-off ticket indicia. Ideally, these redundancy mechanisms would also provide added security against pin-prick attacks of instant tickets where a nefarious person attempts to identify winning indicia via a series of small holes on the SOC such that the attacked ticket still appears to be intact and unplayed to the untrained eye. Particularly, these redundancy and security techniques should enhance the aesthetics of the ticket or document rather than detracting from its appearance. The present invention essentially eliminates or solves problems of misprints or tampered tickets or other documents.

SUMMARY OF THE INVENTION

One aspect of the present invention relates to a redundantly printed security-enhanced document comprising a substrate and at least two different printed variable indicia directly or indirectly on the substrate having a general area, the at least two different printed variable indicia having at least first printed variable indicia printed in the same general area of the substrate as at least second printed variable indicia, the at least first printed variable indicia and the at least second printed variable indicia being present so as to overlap with or be registered so closely together such that failure of the printing of one or more portions of either or any of the at least two printed variable indicia does not alter a meaning of information represented by variable indicia on the redundantly printed security-enhanced document.

The at least first printed variable indicia and the at least second printed variable indicia are printed in different colors, such as or preferably in two or four different colors. The colors can be process colors.

One of the at least first printed variable indicia and the at least second printed variable indicia at least partially can comprise numerals and wherein another of the at least first printed variable indicia and the at least second printed variable indicia at least partially can comprise words.

One of the at least first printed variable indicia and the at least second printed variable indicia at least can comprise drawings or photographs.

Another aspect of the present invention is a method of making a redundantly printed security-enhanced document comprising a substrate having a general area and at least two different printed variable indicia directly or indirectly on the substrate, the method comprising printing directly or indirectly on the substrate at least first printed variable indicia and at least second printed variable indicia in the same general area of the substrate, and during the printing, registering and maintaining registration of the at least first printed variable indicia and the at least second printed variable indicia so as to overlap with or be registered so closely together such that failure of the printing of one or more portions of either or any of the at least two printed variable indicia does not alter a meaning of information represented by variable indicia on the redundantly printed security-enhanced document. The method can print the variable indicia to produce the redundantly printed enhanced-security document having the features set forth above.

In a specific embodiment to this method aspect of the present invention, a contrast delta (i.e., difference or change) between the grayscale equivalent of the underlying substrate and the grayscale equivalent of the at least two printed variable indicia is established to ensure the legibility and consequently the meaning of information represented by the variable indicia in the event that the printing of one or more portions of either or any of the at least two printed variable indicium malfunctions. This specific embodiment thereby compensates for optical noise variances introduced by less than optimal underlying substrate discoloration and/or low contrast.

A third aspect of the present invention relates to a redundantly printed security-enhanced document comprising:

a substrate and at least two different printed variable indicia directly or indirectly on the substrate having a general area, the variable indicia being imaged indicia which provide variable information regarding the document, the at least two different printed variable indicia having at least one component color in the same general area of the substrate as at least second printed variable indicia printed of a different component color, the at least first printed variable indicia component color and the at least second printed variable indicia different component color being present so as to be printed in register to produce resulting redundant process color indicia;

at least one component color variable indicium has a grayscale equivalent level greater than a predetermined minimum threshold; and the at least one process color variable indicium being comprised of a combination of component colors, each of at least two of the component color or combination of component color variable indicia exhibit a grayscale equivalent level greater than the predetermined minimum threshold;

such that the failure of the printing of one portion of either or any of the at least two of the component colors of the printed variable indicia does not alter a meaning of the information of the document represented by the variable indicia on the redundantly printed security-enhanced document.

The redundantly printed security-enhanced document of the third aspect, wherein the predetermined minimum threshold is expressed as a grayscale percentile equivalent, where a value of 0% denotes paper white (no ink) and 100% a solid black (full ink), preferably 25%.

The redundantly printed security-enhanced document of the third aspect, wherein the minimum threshold grayscale equivalent level indicia is adjusted to compensate for substrate color or shading.

The redundantly printed security-enhanced document of the third aspect, wherein each of the at least first printed variable indicia and the at least second printed variable indicia are four colors.

The redundantly printed security-enhanced document of the third aspect, wherein the information regards an intended value of the document.

A fourth aspect of the present invention relates to a method of printing a redundantly printed security-enhanced document comprising a substrate and at least two different printed variable indicia directly or indirectly on the substrate having a general area, the variable indicia being imaged indicia which provide variable information regarding the document, the at least two different printed variable indicia having at least one component color in the same general area of the substrate as at least second printed variable indicia printed of a different component color, the at least first printed variable indicia component color and the at least second printed variable indicia different component color being present so as to be printed in register to produce resulting redundant process color indicia, the method comprising:

(a) printing each component color with separate physically distinct print heads;

(b) ensuring that the resultant printed process color indicia maintains a grayscale equivalent level of a process color greater than a predetermined minimum threshold; and (c) ensuring that each of the at least two separate component colors or combination of component colors of the printed variable indicia exhibit a grayscale equivalent level greater than the predetermined minimum threshold;

such that, the failure of the printing of one portion of either or any of the at least two printed component colors of the variable indicia does not alter a meaning of information of the document represented by the variable indicia on the redundantly printed security-enhanced document.

The method of the fourth aspect, wherein the predetermined minimum threshold is expressed as a grayscale percentile equivalent where a value of 0% denotes paper white (no ink) and 100% a solid black (full ink).

The method of the immediately preceding aspect, further comprising printing the minimum threshold grayscale percentile equivalent level indicia to be 25%.

The method of the fourth aspect, further comprising printing the minimum threshold grayscale equivalent level indicia to compensate for substrate color or shading.

The method of the third aspect, further comprising printing each of the at least first printed variable indicia and the at least second printed variable indicia in four colors.

The method of the fourth aspect, wherein the information regards an intended value of the document.

Objects and advantages of the invention will be set forth in part in the following description, or may be apparent from the present description, or may be learned through practice of the invention.

In accordance with aspects of the invention, a security-enhanced document with a removable SOC is produced, which may be an instant lottery ticket in certain embodiments. The document includes any variable imaged indicium that determines if the document wins any prize(s) or contains data that is otherwise secure under the SOC. Thus, as used herein, "ticket" or "instant lottery ticket" includes both lottery tickets and other types of security enhanced documents using scratch-off coatings.

In a first embodiment, the variable indicia are imaged using all or some of the standard CMYK (i.e., Cyan, Magenta, Yellow, and blacK) process colors. In this embodiment, redundancy is achieved via multiple ink applications due to the serial application of the individual CMYK process colors.

In another embodiment, the variable indicia itself is imaged in one color with at least one secondary color providing a written description of the indicia in the background. Like the first embodiment, this embodiment achieves redundancy via multiple ink applications. In this particular embodiment, the indicia and background colors do not necessarily have to be CMYK.

In still another embodiment, the variable indicia are imaged utilizing patterns of multiple colors. Again, redundancy is achieved via multiple ink applications.

In yet another embodiment, the variable indicia are imaged with an inverted background color with redundancy achieved via the inverted foreground and background different colors. As used herein, "inverted" colored indicia in the foreground or background of a printed substrate uses a light-colored background with dark-colored foreground or vice versa, or uses different contrasting colors, or uses complementary colors or otherwise different colors for the background and foreground, such that the color indicia in both the foreground and background are visible and legible. This embodiment also has the advantage of creating confusion coloration as a countermeasure to pin pricking attacks.

In still another embodiment, process color redundancy is ensured by digitally converting process colors to grayscale to determine if the process color is above a minimum threshold of grey. This ensures the discernibility of the variable indicia imaged with an intended process color, as well as the discernibility of a process color with one or more component colors missing due to a failure to print. With this embodiment, two or more individual component colors combined to produce an overall process color are evaluated for each individual component color's contribution to the overall process color grayscale level. Thus, where the failure of at least one component color to print causes the resulting defective process color to fall below the minimum threshold of gray, process colors are identified and eliminated from the pool of inherently redundant process colors.

In all of these embodiments, the variable indicia and their background are composed of at least two separate colors. The essential concept of the invention is to provide imaging redundancy since different colors require different ink applications with the different ink applications providing redundancy due to different ink hardware, ink, etc. for each color.

Described are a number of printing mechanisms and methodologies that provide practical details for reliably producing redundant indicia under a SOC that are immune to failure of any one high speed variable ink application system. Although the examples provided herein are primarily related to instant tickets, it is clear that the same methods are applicable to any type of document (e.g., telephone card, prepaid cards, vouchers, bank security instruments, coupons, etc.) where information is protected by a SOC.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 11 shows examples of variable indicium.

DETAILED DESCRIPTION

Figure 1:
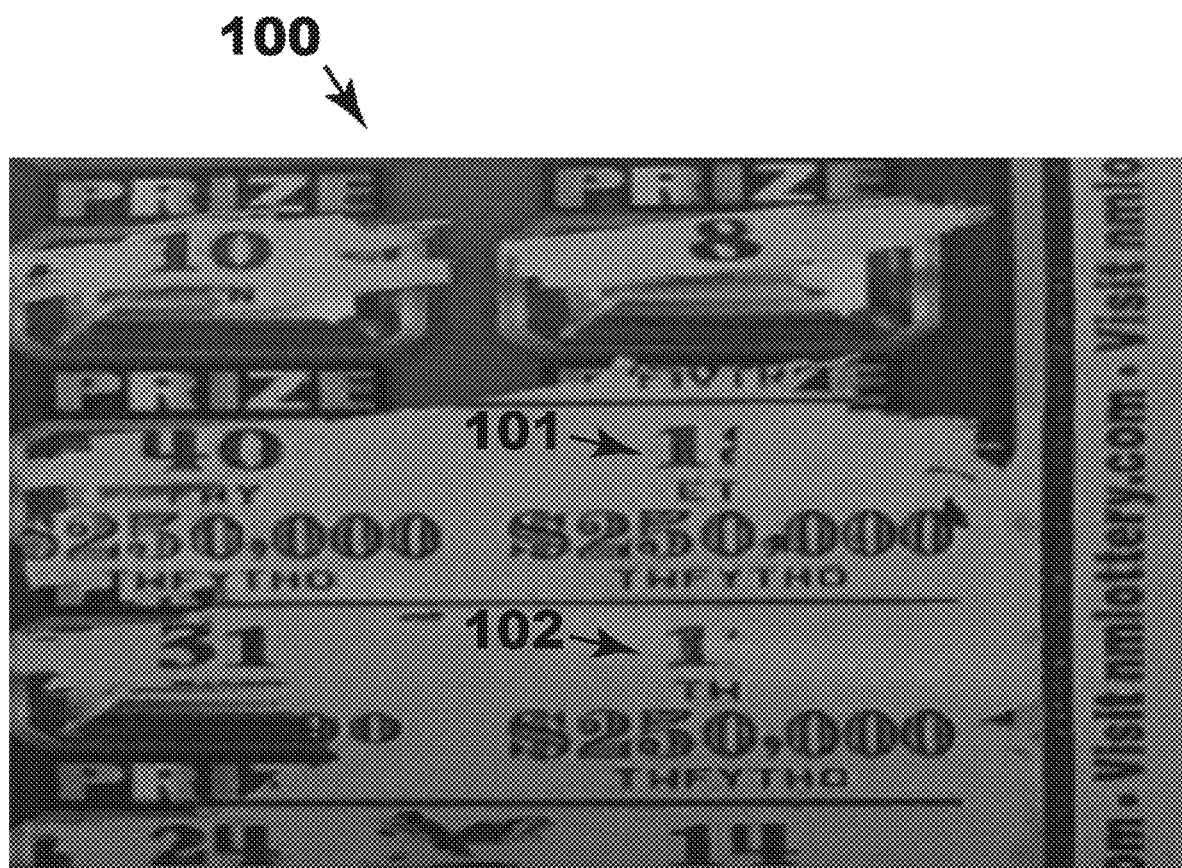
FIG. 1 is an exemplary view of an actual prior art ticket from the New Mexico Lottery that falsely appeared to be a $500,000 winner due to clogged inkjet heads using monochromatic color.

As used herein, the words "image" or "print" are used equivalently and mean that whatever indicium or indicia is or are created directly or indirectly on any substrate may be done by any known imaging or printing method or equipment. Likewise, "imaging" or "printing" describing a method and "imaged" or "printed" describing the resulting indicium or indicia are used equivalently and correspondingly to "image" or "print."

Figure 11:
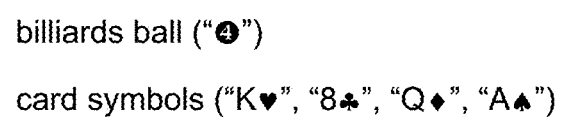

Certain terminology is used herein for convenience only and is not to be taken as a limitation on the present invention. The words "a" and "an", as used in the claims and in the corresponding portions of the specification, mean "at least one." The terms "scratch-off game piece" or other "scratch-off document," hereinafter is referred to generally as an "instant ticket" or simply "ticket." Additionally, the terms "full-color" and "process color" are also used interchangeably throughout the specification as terms of convenience for producing a variety of colors by discrete combinations of applications of pigmented primary inks or dyes "CMYK" (i.e., Cyan, Magenta, Yellow, and blacK), or in some cases six colors (e.g., Hexachrome printing process uses CMYK inks plus Orange and Green inks), or alternatively eight colors—e.g., CMYK plus lighter shades of cyan (LC), magenta (LM), yellow (LY), and black (YK). The term "composite color" refers to two or more of the individual colors used to comprise an overall "process color" with the term "component color" referring to one individual color that is used with at least one other component color to create a combined "composite" or "process" color. Also, as used herein, the terms "multi" or "multiple" or similar terms means at least two, and may also mean three, four, or more, for example, unless otherwise indicated in the context of the use of the terms. Finally, "variable" indicium or indicia refers to imaged indicia which indicates information relating a property, such as, without limit, a value of the document, for example, without limit, a lottery ticket, coupon, commercial game piece or the like, where the variable indicium or indicia is or are ultimately hidden by a SOC until the information or value is authorized to be seen, such as by a purchaser of the document who scratches off the SOC, revealing the variable indicium or indicia. Examples of variable indicium as a printed embodiment include: letters, numbers, icons or figures—e.g., "$", card face, billiards ball, card symbols, and the like. Symbols for the billiards ball and card symbols are shown in FIG. 11.

Reference will now be made in detail to examples of the invention, one or more embodiments of which are illustrated in the drawings. Each example is provided by way of explanation of the invention, and not meant as a limitation of the invention. For example, features illustrated or described as part of one embodiment, may be used with another embodiment to yield still a further embodiment. The present invention encompasses these and other modifications and variations as come within the scope and spirit of the invention.

FIG. 4 depicts a first representative example of modified lottery-type instant ticket indicia 125 comprised of multiple (e.g., four—CMYK) ink applications overlaying the same image for redundancy. To better illustrate the concept of multi-application printing, redundancy indicia 125 include four simulated color misprints—127 through 130. The correctly printed portions 126, namely the decimal point and left half of the units place "0" and "5" numerals as well as the left half of the dollar sign "$", of indicia 125 illustrate how the indicia would appear with no misprints. The misprints illustrated in indicia 125 are: the right half of the "$" symbol 127 missing the cyan ink application, the right half of the "5" numeral 128 missing the magenta ink application, the tens place "0" numeral 129 completely missing the yellow ink application, and the right half of the units place "0" numeral 130 missing the black ink application. As is readily apparent in the redundant variable indicia 125 of FIG. 4, the absence of any one of the CMYK process colors still leaves indicia 125 easily readable in its intended form. In fact, it is somewhat difficult for one not skilled in the art to detect any failure of ink applications in indicia 125. Thus, the redundant printing of all of the CMYK colors alleviates any reasonable misinterpretation of the information conveyed by the variable indicia 125, namely a value of $5.00.

Figure 2:
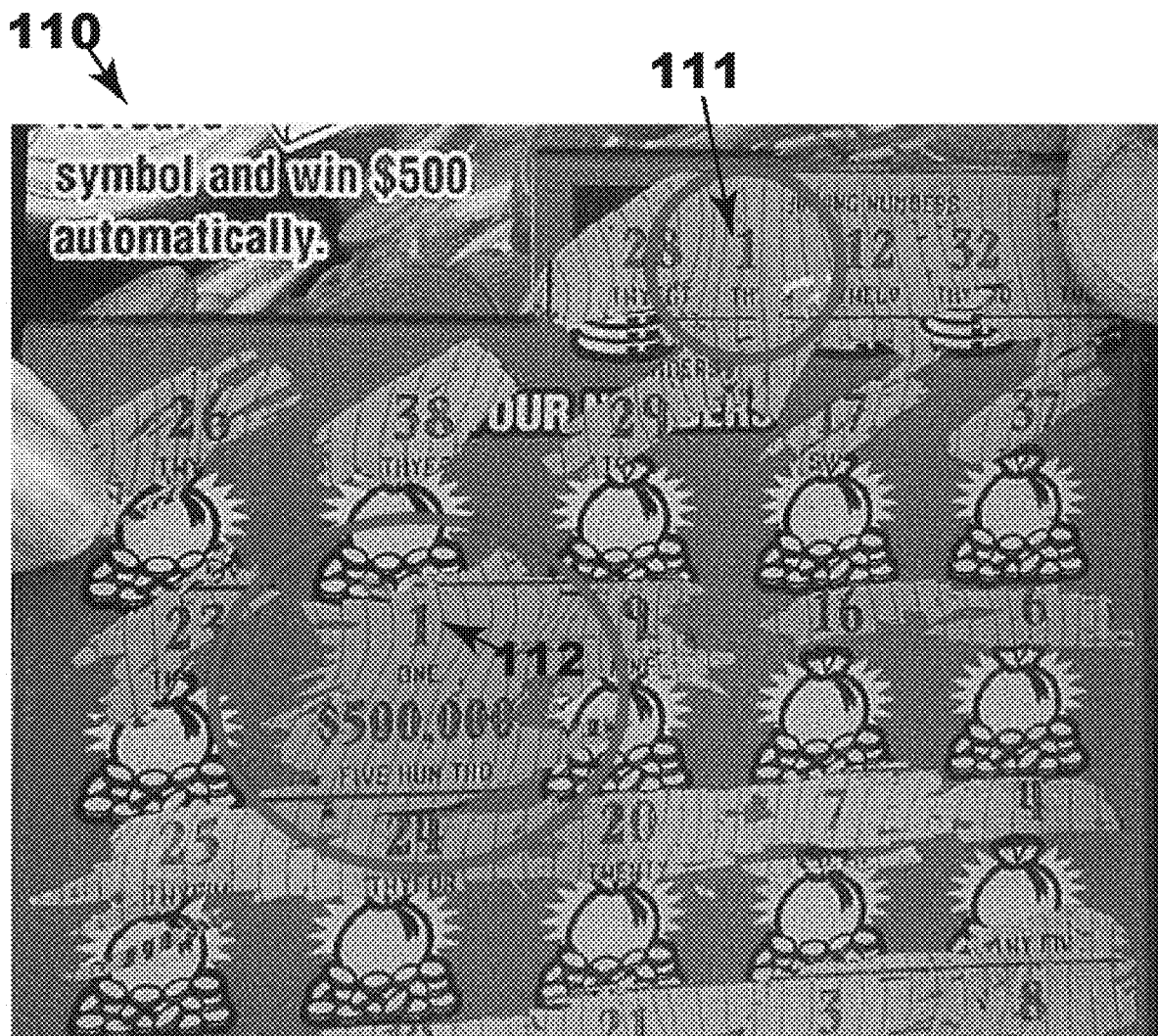
FIG. 2 is a second exemplary view of an actual prior art ticket from the Florida Lottery that falsely appeared to be a $500,000 winner due to clogged inkjet heads using monochromatic color.
Figure 3:
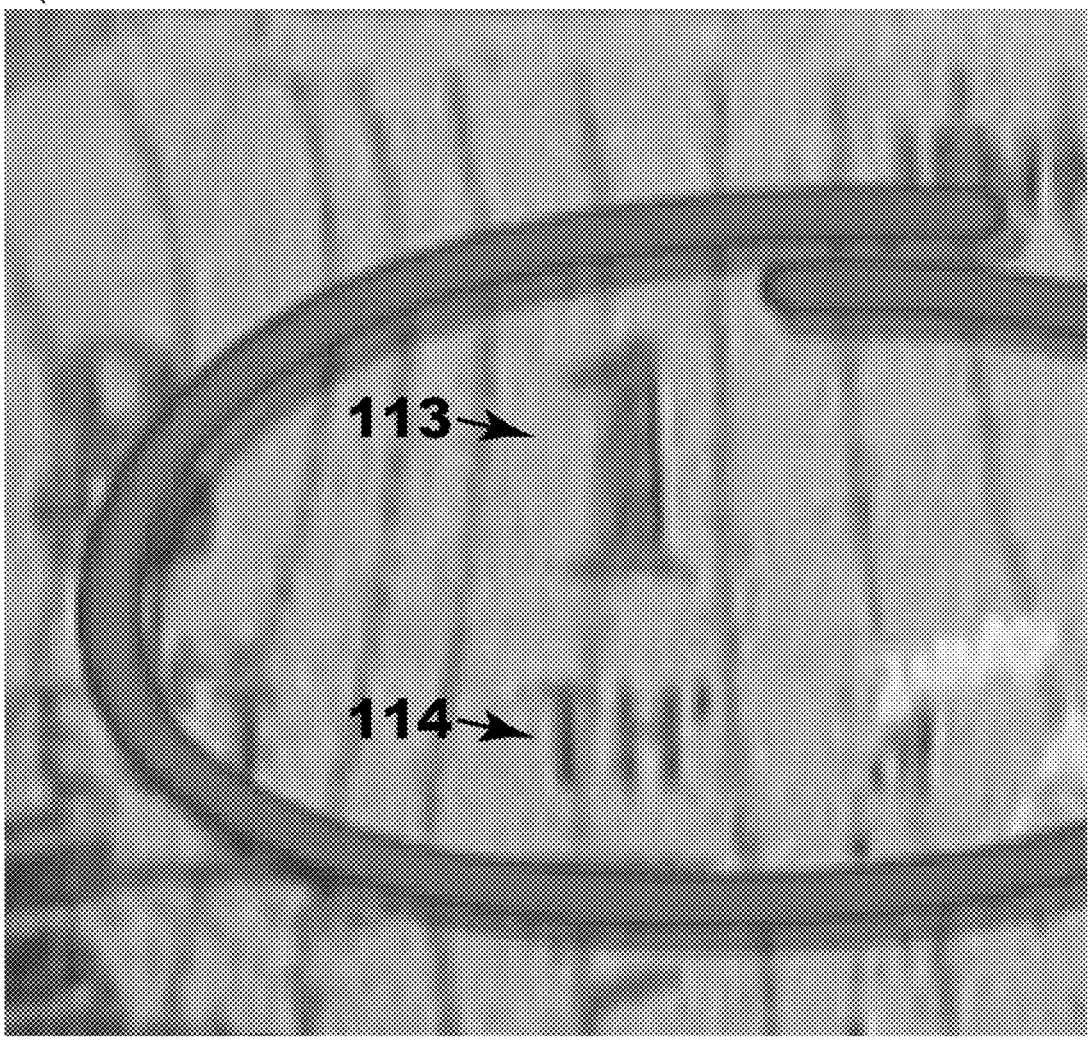
FIG. 3 is a detailed view of the prior art Florida Lottery misprinted ticket of FIG. 2 highlighting the misprint and the associated abbreviated caption.

Multi-color indicia redundancy can be achieved with fewer colors, so long as at least two colors are applied to each indicium. The at least two redundant colors can be various spot colors and need not comprise the standard CMYK process colors. However, this is not to imply that all process color combinations of at least two or more colors are inherently redundant. As its name implies, "redundant indicia" comprised of process colors must remain legible in the event that any one color fails to print (e.g., due to one or more clogged inkjet nozzles), thereby protecting against catastrophic misinterpretations as illustrated in prior art FIGS. 1 through 3. Thus, to be truly redundant, each component color comprising a combined process color indicium should be analyzed to determine if each component color retains sufficient legibility to convey the intended information in the indicium in the event of a failure of at least one other color to print occurs.

By converting each component color to its grayscale equivalent, in which the value of each pixel is a single sample (i.e., carries only intensity information), a relative analytic can be determined that can effectively provide a minimum threshold of legibility of each component color's contribution to the process color's indicium redundancy. While there are multiple known methods to provide a metric for gray scale equivalence, when determining minimal threshold values for each component color's contribution to a theoretical redundant indicium process color, the known printing convention of employing percentages (i.e., a scale of 0% to 100% line screen) is preferred. While the percentage range of this methodology encompasses a total of only 101 intensities, which are insufficient to represent a broad gradient of grays, the range is nevertheless sufficient to reliably identify thresholds for minimum legibility of each contribution component color for most circumstances. Also, the intuitive nature of percentile notation is commonly used in printing to denote how much ink is employed in halftoning and is thereby a familiar standard for most printers. It should also be noted that the common printing percentile notation approach scale is reversed (to most other systems of grayscale measurement) in that a value of 0% denotes paper white (no ink) and 100% a solid black (full ink). Thus, the grayscale equivalence metric correlates directly with screen line levels of black ink (e.g., 25% black line screen equates to 25% grayscale equivalent), but not necessarily other colors (e.g., 100% line screen of yellow equates to only 12% grayscale equivalent). Of course, as would be apparent to one skilled in the art in view of this disclosure, there are other methods of grayscale numerical representation (e.g., rational numbers, binary quantized values) that may be more desirable in some circumstances.

With the preferred embodiment of printing percentile notation to determine minimum thresholds of redundancy, as a general rule in order to ensure redundancy, two or more component colors need to combine in such a way that should a portion of any color fail to print the remaining color(s) need to contribute or combine to exhibit a minimum 25% grayscale equivalent over the entire process color indicium. It should be noted, that this 25% minimum grayscale threshold is both conservative and somewhat of an arbitrary level with actual legibility varying due to multiple reasons—e.g., background (i.e., substrate) color, lighting, eyesight, indicium design (e.g., alphanumeric font choice, icon or figure design), substrate smoothness, print quality. However, as a general rule the 25% minimum grayscale redundancy threshold provides a conservative value that ensures process color indicium redundancy under most circumstances.

Figure 4A:
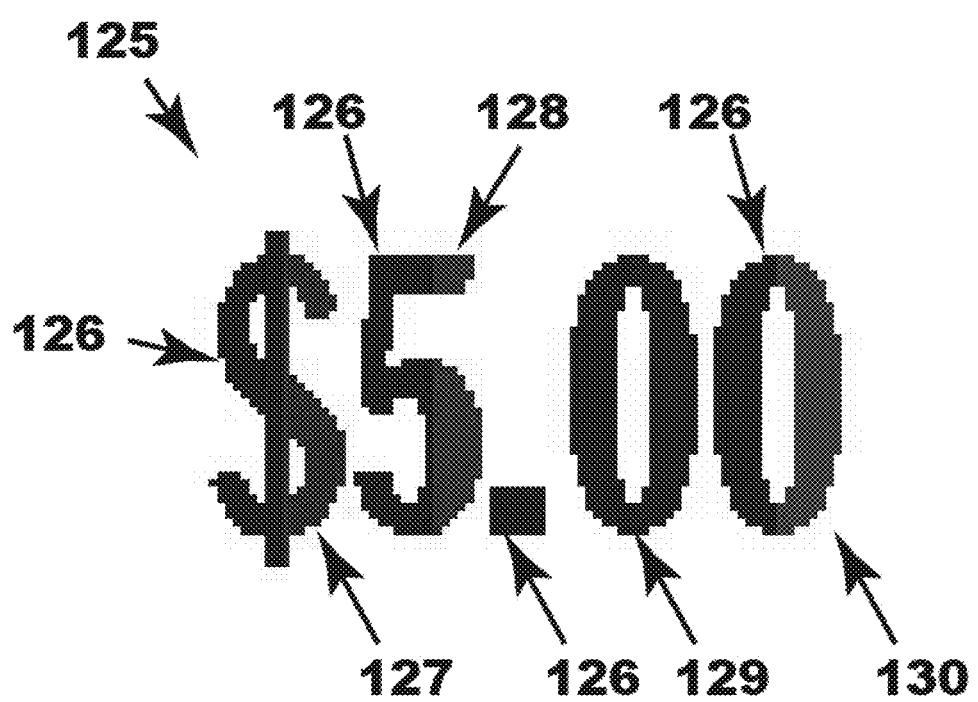
FIG. 4A is a front elevation view of a first representative example of modified lottery-type instant ticket indicia comprised of multiple (i.e., CMYK) ink applications of at least two different colors for redundancy.
Figure 4B:
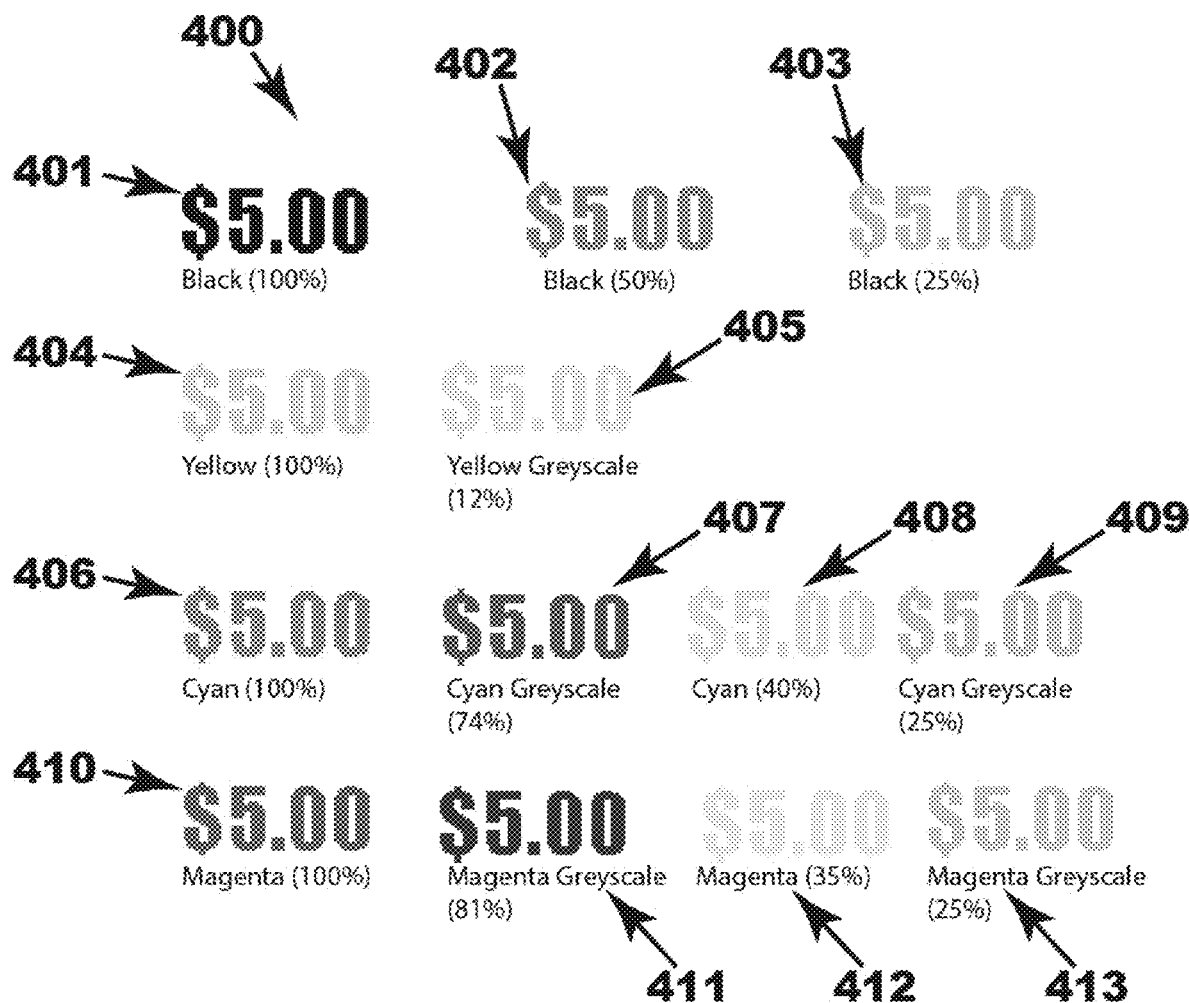
FIG. 4B is a front elevation view of representative examples of lottery-type instant ticket indicia comprised of either black, yellow, cyan, or magenta single ink applications (from top to bottom) with their corresponding gray scale equivalence.
Figure 4C:
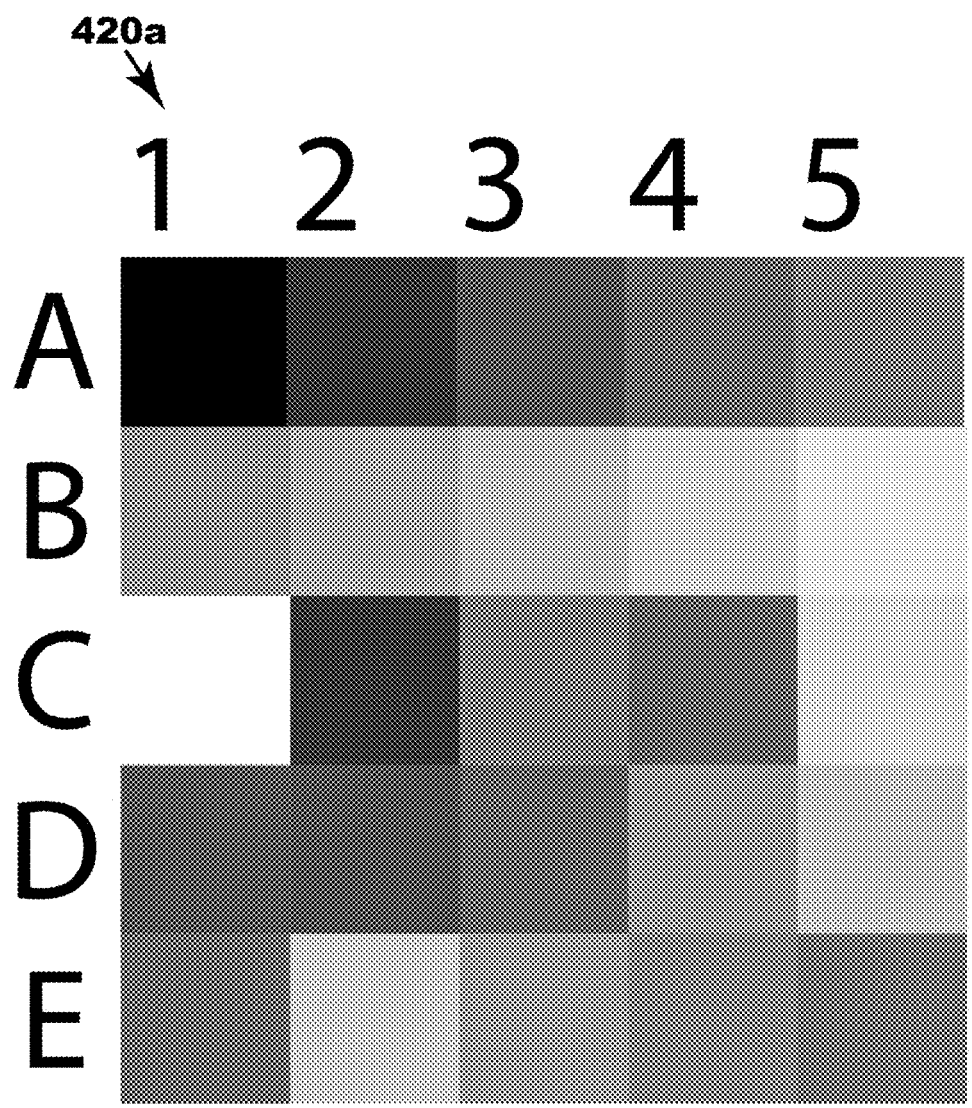
FIGS. 4C, 4D, 4E, and 4F are front elevation views of submatrices that collectively illustrate a prior art representative example of a matrix of process colors, each color comprised of at least one component of CMYK.
Figure 4D:
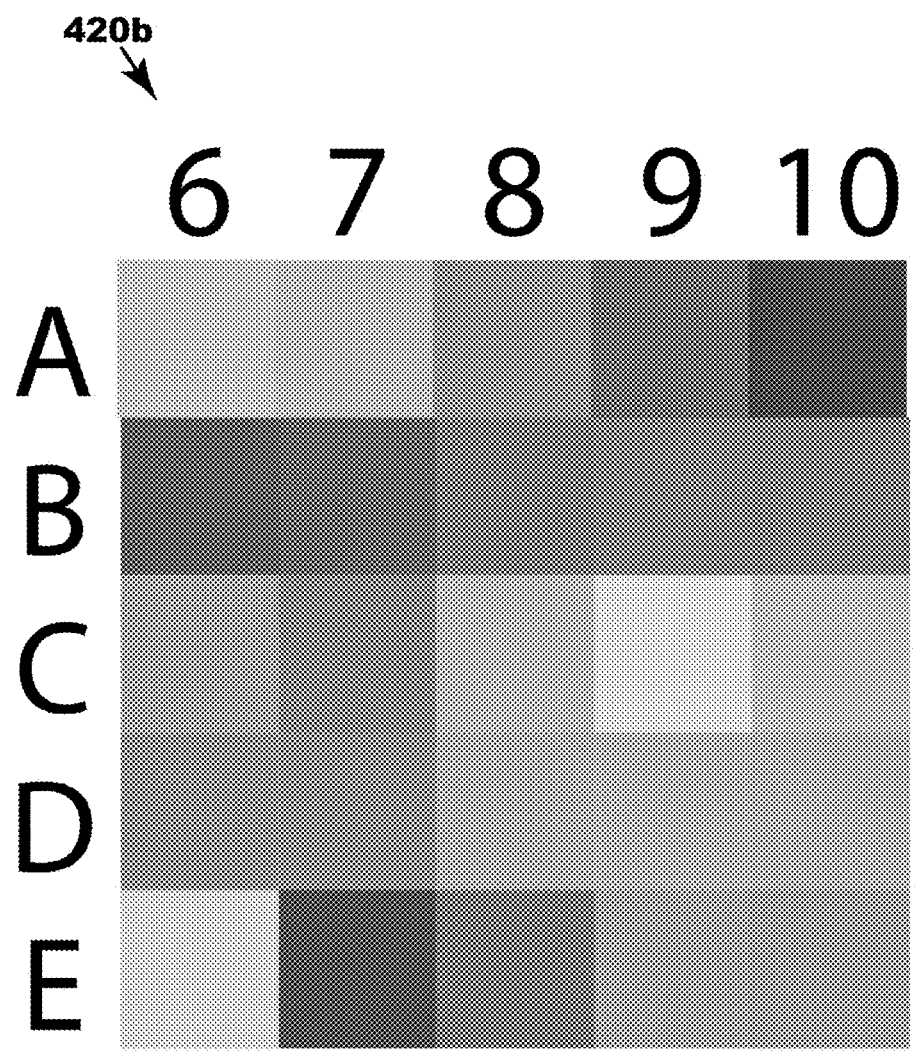
Figure 4E:
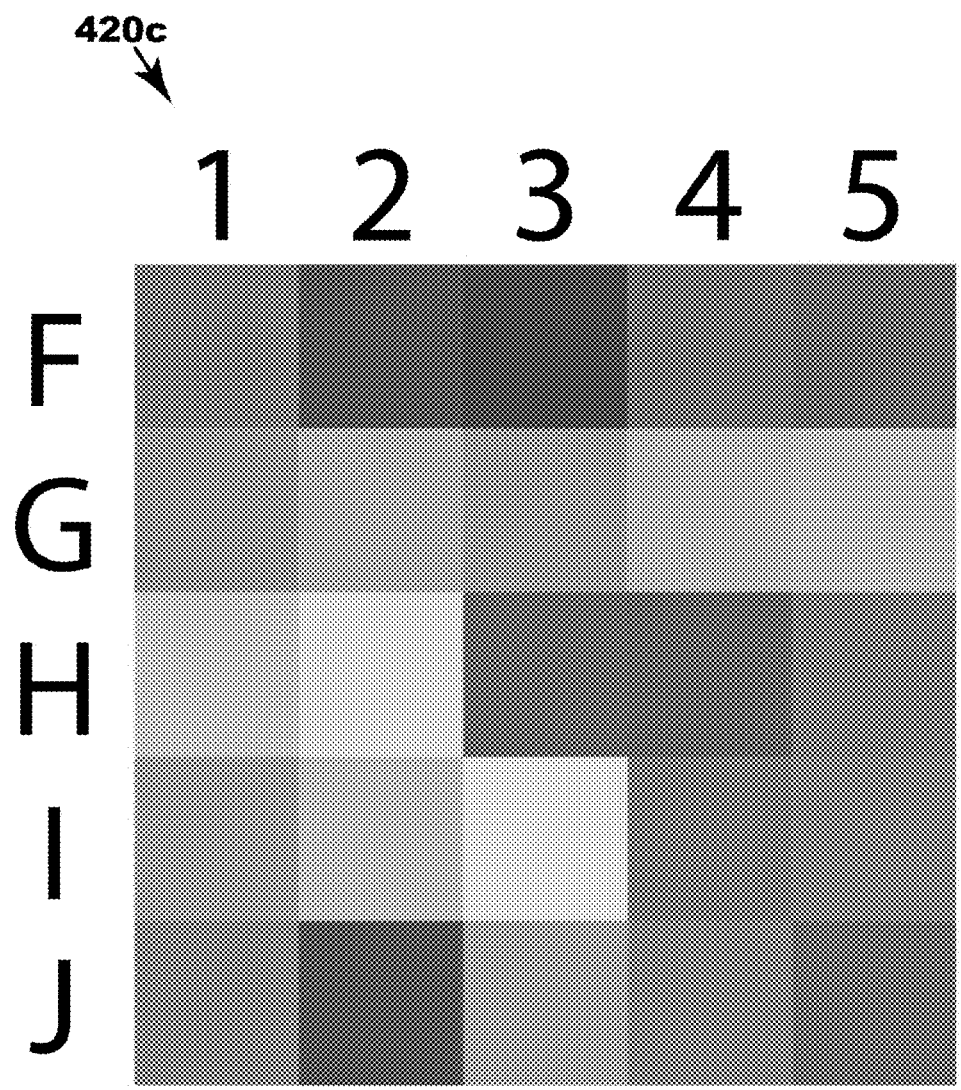
Figure 4F:
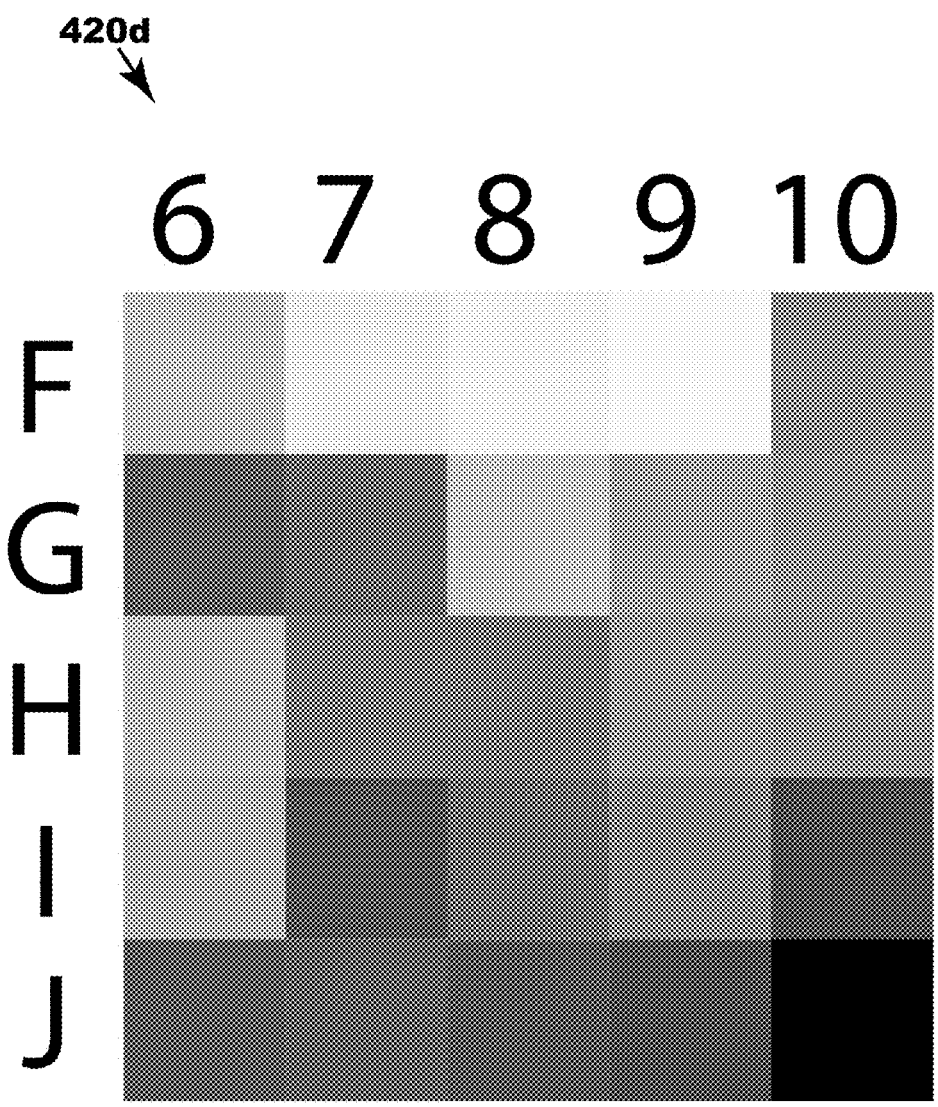

FIG. 4B provides a front elevation view 400 of four representative examples of lottery-type instant ticket indicia 401, 404, 406, and 410 comprised of either black, yellow, cyan, or magenta single (monochromatic) ink applications of varying line screens with their corresponding grayscale equivalence in percentile notation. Indicium 401 is illustrated exclusively with black ink at 100% line screen. However, to prevent ink from bleeding or running, solid black ink is typically applied with a 50% line screen as shown for indicium 402, resulting in a 50% grayscale. If this image is further reduced to 25% grayscale as in indicium 403, it can be seen that the resulting printed indicium is at the threshold of becoming difficult to discern under some circumstances. Again, with black ink the line screen and grayscale percentages are equivalent.

However, with other component process colors (e.g., "C", or "M", or "Y"), there is not necessarily a one-to-one correlation between line screen and grayscale, hence the printed color indicium must be digitally converted to grayscale via any of multiple commercial image processing software programs (e.g., Adobe Photoshop) to determine a grayscale equivalence percentile. For example, 100% yellow line screen 404 will only produce a 12% grayscale equivalence percentile (i.e., less than the preferred 25% grayscale), thereby indicating that yellow cannot be utilized as a redundant component color—i.e., while yellow is acceptable to use as a component color in redundant process color indicia, it cannot by itself impart redundancy and therefore all process colors that are comprised of yellow and one other color are not redundant. In contrast, 100% line screen cyan 406 and magenta 410 convert to 74% (indicium 407) and 81% (indicium 411) grayscale equivalence respectively, thus indicating that cyan and magenta can be utilized as redundant component colors under some circumstances. However, cyan 408 applied with a line screen of 40% and magenta 412 applied with a line screen of 35% both convert to the minimum grayscale equivalent threshold of 25% (indicia 409 and 413, respectively), thereby indicating that cyan and magenta cannot be utilized as a redundant component color below these line screen values.

FIGS. 4C, 4D, 4E, and 4F are front elevation views of 5×5 submatrices 420a, 420b, 420c, and 420d, respectively, that collectively illustrate a prior art representative example of a 10×10 matrix 420 of process colors with each color comprised of at least one component of CMYK. As shown in FIGS. 4C-4F, the matrix 420 is arranged in alphabetically assigned rows ("A" through "J") by numerical columns ("1" through "10"), with each cell in the matrix 420 illustrating a different process color. The line screen percentage of each CMYK component color necessary to generate the process color of a given cell is provided in Table 1.

TABLE 1

| Prior FIGs. 4C-4F Art Component Color Breakdown | | | | | | | | | | | |
|---|---|---|---|---|---|---|---|---|---|---|---|
| Row | Color | 1 | 2 | 3 | 4 | 5 | 6 | 7 | 8 | 9 | 10 |
| A | C | 0% | 0% | 0% | 0% | 0% | 40% | 40% | 20% | 20% | 20% |
|   | M | 0% | 0% | 0% | 0% | 0% | 0% | 0% | 0% | 0% | 0% |
|   | Y | 0% | 0% | 0% | 0% | 0% | 0% | 0% | 0% | 0% | 0% |
|   | K | 100% | 90% | 80% | 70% | 60% | 0% | 0% | 20% | 60% | 80% |
| B | C | 0% | 0% | 0% | 0% | 0% | 40% | 60% | 40% | 60% | 60% |
|   | M | 0% | 0% | 0% | 0% | 0% | 0% | 0% | 0% | 0% | 0% |
|   | Y | 0% | 0% | 0% | 0% | 0% | 0% | 0% | 20% | 40% | 60% |
|   | K | 50% | 40% | 30% | 20% | 10% | 60% | 40% | 20% | 20% | 20% |
| C | C | 0% | 0% | 0% | 0% | 0% | 40% | 60% | 40% | 60% | 60% |
|   | M | 0% | 0% | 0% | 0% | 0% | 0% | 0% | 0% | 0% | 0% |
|   | Y | 0% | 0% | 0% | 0% | 0% | 0% | 0% | 20% | 40% | 60% |
|   | K | 50% | 40% | 30% | 20% | 10% | 60% | 40% | 20% | 20% | 20% |
| D | C | 0% | 0% | 20% | 0% | 0% | 20% | 20% | 20% | 20% | 40% |
|   | M | 100% | 100% | 80% | 60% | 40% | 0% | 0% | 0% | 0% | 0% |
|   | Y | 100% | 0% | 0% | 100% | 20% | 20% | 40% | 60% | 40% | 100% |
|   | K | 0% | 0% | 20% | 0% | 0% | 40% | 40% | 20% | 20% | 0% |
| E | C | 0% | 20% | 40% | 60% | 60% | 20% | 0% | 0% | 0% | 0% |
|   | M | 20% | 20% | 40% | 40% | 60% | 0% | 0% | 0% | 0% | 0% |
|   | Y | 20% | 0% | 0% | 0% | 0% | 60% | 20% | 20% | 20% | 40% |
|   | K | 60% | 0% | 0% | 0% | 0% | 0% | 80% | 60% | 40% | 40% |
| F | C | 40% | 60% | 40% | 40% | 100% | 0% | 0% | 0% | 0% | 0% |
|   | M | 40% | 40% | 40% | 20% | 20% | 0% | 0% | 0% | 0% | 20% |
|   | Y | 0% | 0% | 0% | 0% | 0% | 60% | 60% | 40% | 20% | 40% |
|   | K | 20% | 40% | 60% | 40% | 0% | 20% | 0% | 0% | 0% | 40% |
| G | C | 0% | 0% | 0% | 0% | 0% | 0% | 0% | 0% | 0% | 0% |
|   | M | 40% | 20% | 60% | 40% | 40% | 40% | 60% | 40% | 40% | 20% |
|   | Y | 60% | 60% | 80% | 80% | 60% | 0% | 0% | 0% | 0% | 0% |
|   | K | 20% | 20% | 0% | 0% | 0% | 60% | 40% | 0% | 20% | 40% |
| H | C | 0% | 0% | 0% | 0% | 0% | 0% | 20% | 20% | 20% | 20% |
|   | M | 20% | 20% | 20% | 60% | 60% | 20% | 60% | 80% | 60% | 40% |
|   | Y | 100% | 40% | 40% | 60% | 80% | 0% | 0% | 0% | 0% | 0% |
|   | K | 0% | 0% | 60% | 40% | 20% | 20% | 20% | 0% | 0% | 20% |

TABLE 1-continued

Prior FIGs. 4C-4F Art Component Color Breakdown

| Row | Color | 1 | 2 | 3 | 4 | 5 | 6 | 7 | 8 | 9 | 10 |
|-----|-------|-----|------|-----|-----|-----|-----|-----|-----|-----|------|
| I | C | 0% | 0% | 0% | 0% | 0% | 20% | 20% | 20% | 40% | 40% |
|   | M | 60% | 40% | 20% | 40% | 60% | 40% | 0% | 40% | 60% | 100% |
|   | Y | 60% | 40% | 20% | 20% | 40% | 0% | 0% | 0% | 0% | 0% |
|   | K | 0% | 0% | 0% | 40% | 20% | 0% | 60% | 40% | 0% | 0% |
| J | C | 0% | 0% | 0% | 0% | 0% | 40% | 60% | 40% | 60% | 100% |
|   | M | 60% | 100% | 60% | 80% | 40% | 80% | 80% | 60% | 80% | 100% |
|   | Y | 20% | 60% | 40% | 40% | 20% | 0% | 0% | 0% | 0% | 100% |
|   | K | 20% | 0% | 0% | 0% | 20% | 20% | 0% | 40% | 20% | 100% |

Figure 4G:
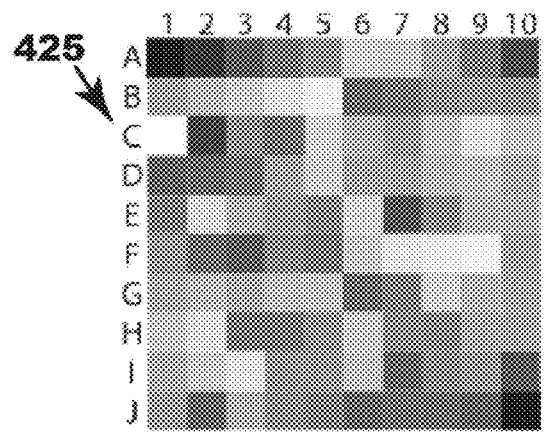
FIG. 4G is a front elevation view of the representative example matrix of process colors of FIGS. 4C-4F wherein inherently non-redundant process colors are highlighted.
Figure 4G:
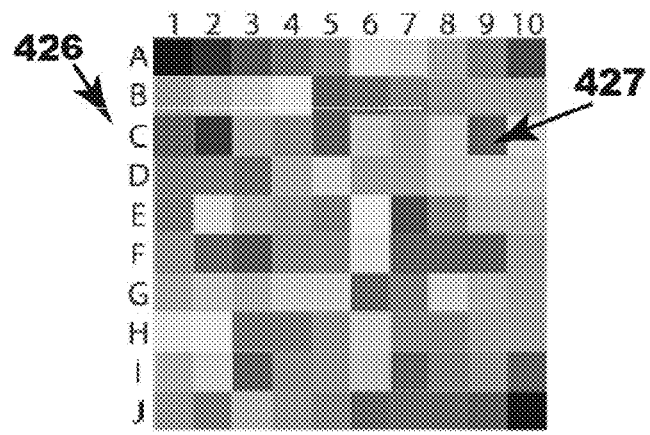
Figure 4G:
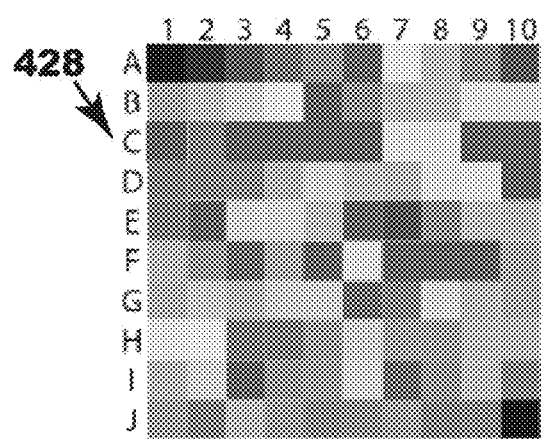
Figure 4G:
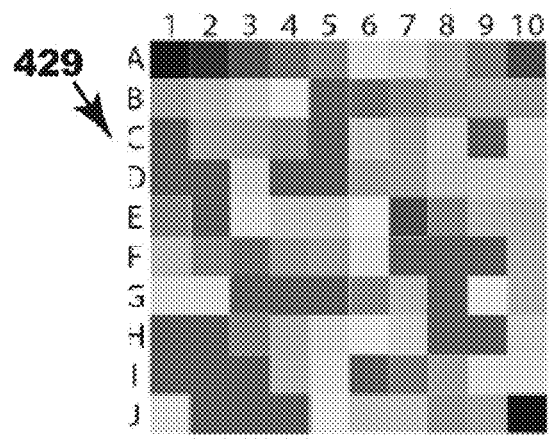
Figure 4G:
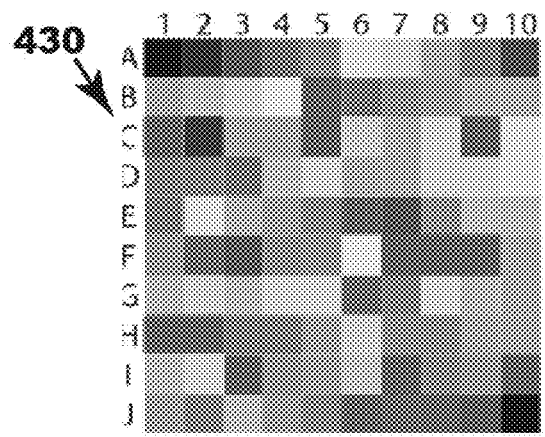
Figure 4G:
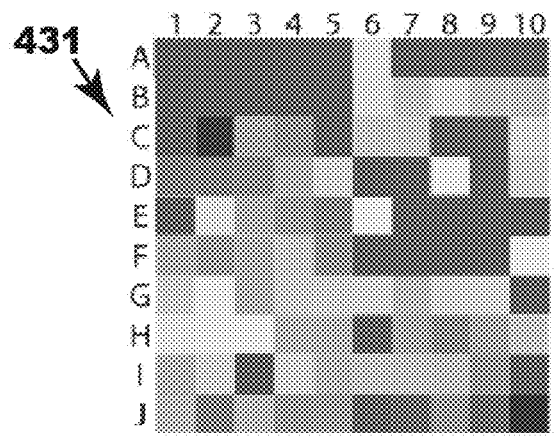

FIG. 4G illustrates a copy 425 of the representative color matrix 420 of FIGS. 4C-4F in five different multiple renderings (matrices 426, 428, 429, 430, and 431) with each rendering highlighting a subset of the unacceptable colors for redundant process color indicium imaging. Rendering 426 highlights the process colors that fall below the preferred general rule threshold of 25% grayscale equivalence even when all component colors print as intended—e.g., cell "C9" (427) "Ghost Green" comprised of 20% cyan, 0% magenta, 20% yellow, and 0% black. Matrix rendering 428 highlights the process colors that fall below the preferred general rule threshold of 25% grayscale when the cyan component color fails to print in addition to the unacceptable process colors of 426—e.g., cell "E2" "Powder Blue" comprised of 20% cyan, 20% magenta, 0% yellow, and 0% black. Matrix rendering 429 highlights the process colors that fall below the preferred general rule threshold of 25% grayscale when the magenta component color fails to print in addition to the unacceptable process colors of 426—e.g., cell "D4" "Orange" comprised of 0% cyan, 60% magenta, 100% yellow, and 0% black. Matrix rendering 430 highlights the process colors that fall below the preferred general rule threshold of 25% grayscale when the yellow component color fails to print in addition to the unacceptable process colors of 426—e.g., cell "E6" "Moon Green" comprised of 20% cyan, 0% magenta, 60% yellow, and 0% black. Finally, matrix rendering 431 highlights the process colors that fall below the preferred general rule threshold of 25% grayscale when the black component color fails to print in addition to the unacceptable process colors of 426—e.g., cell "H6" "Pale Purple" comprised of 0% cyan, 20% magenta, 0% yellow, and 20% black.

Figure 4H:
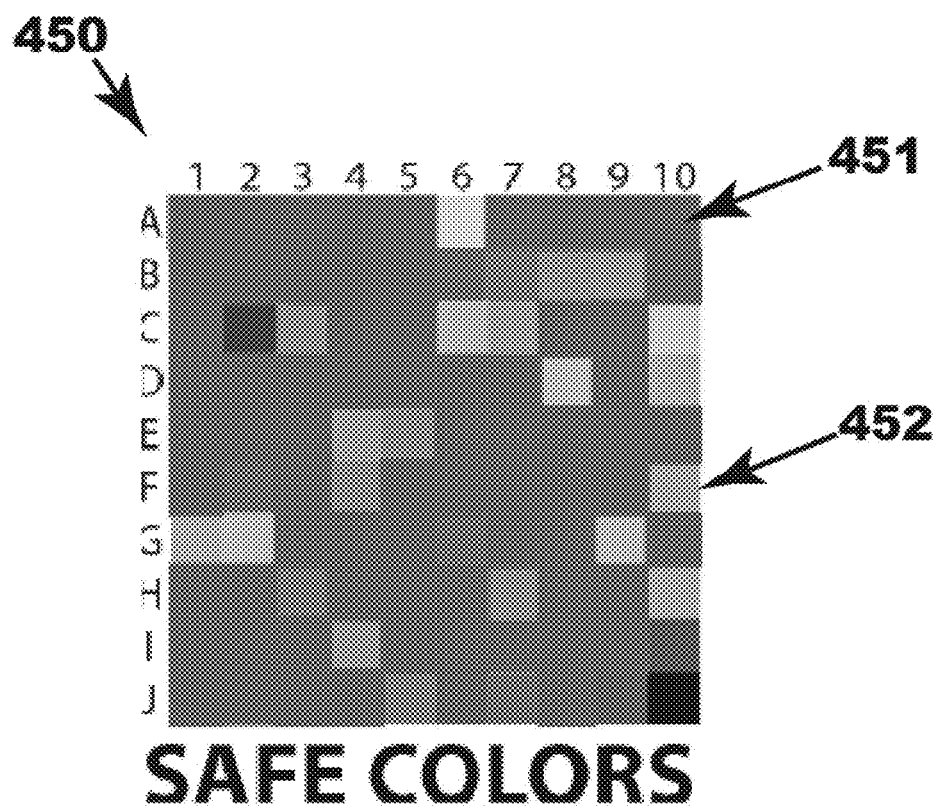
FIG. 4H is a front elevation view of the representative example matrix of process colors of FIGS. 4C-4F wherein inherently redundant process colors are highlighted.

When all of the unacceptable and non-redundant process colors of FIG. 4G are compounded (i.e., "ORed" together) the matrix rendering 450 of FIG. 4H is generated, wherein inherently redundant and acceptable process colors are highlighted. In matrix rendering 450, the cells of the non-redundant and unacceptable process colors corresponding to the matrix renderings 426-431 are overwritten in red 451, with the acceptable and redundant process colors illustrated as they would print with all component colors functional, such as indicated by cell 452.

Figure 4I:
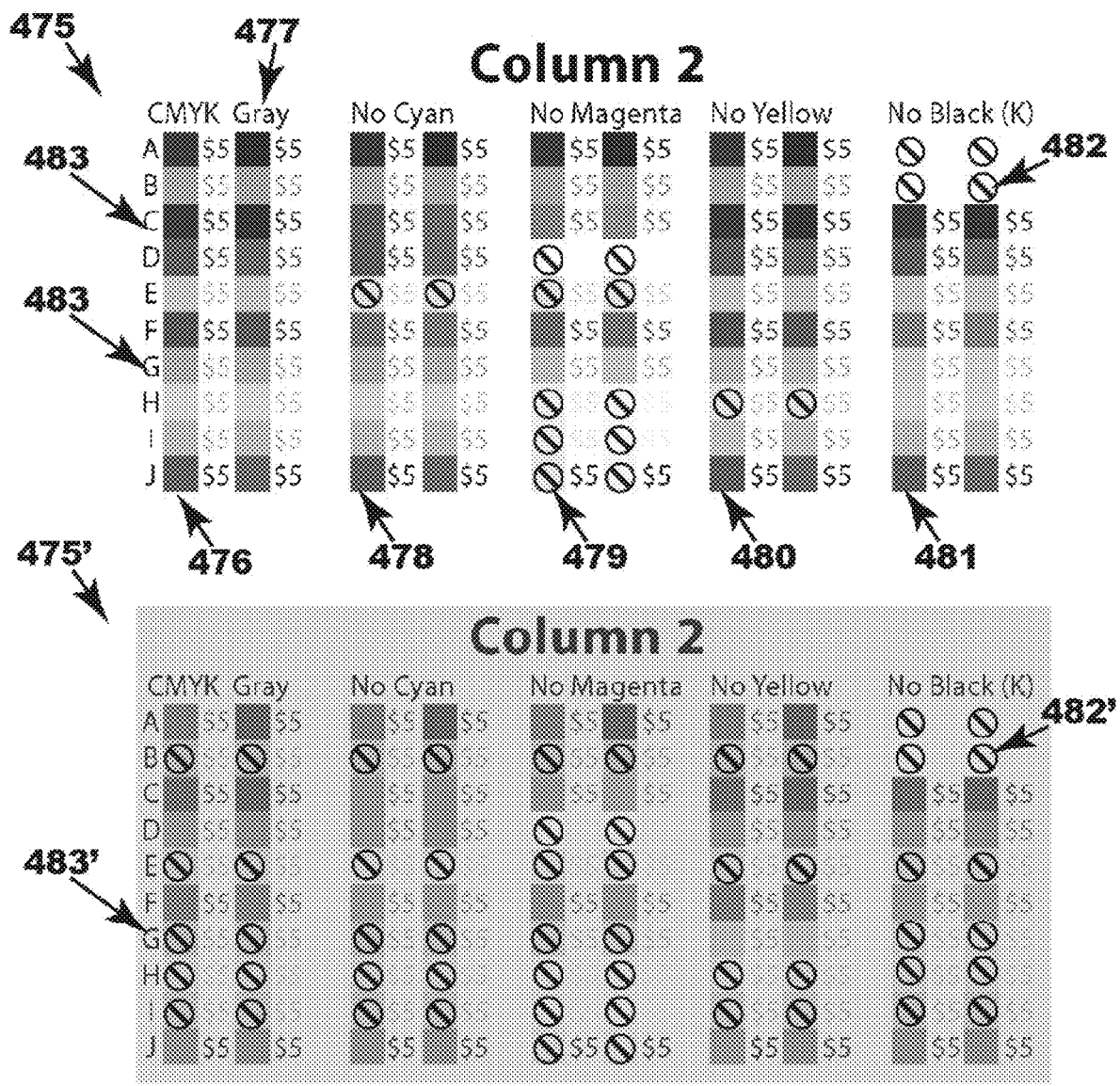
FIG. 4I is a front elevation view of column two of the representative example matrix of process colors of FIGS. 4C-4F highlighting process color redundancy with respect to background substrate color.

As previously stated, the preferred general rule threshold of 25% minimum grayscale is conservative and dependent on other factors such as background or substrate color. For example, FIG. 4I presents two detailed breakdowns 475 and 475' of column "2" of the 10×10 matrix 420 of process colors illustrated in FIGS. 4C-4F. With the two detailed breakdowns (475 and 475') of FIG. 4I, one breakdown 475 illustrates the process colors of column "2" legibility on a white substrate and the other breakdown 475' emphasizes legibility for the same column "2" process colors as they would appear on a gray substrate. The two breakdowns 475 and 475' are identical except the background of 475' is gray, which is typical of instant scratch-off tickets.

Each breakdown 475 and 475' provides five sets of column "2" pairs from the matrix 420 illustrating both the resulting process color under the specified condition (e.g., breakdown 476) as well as its grayscale equivalent (e.g., breakdown 477). The five sets of column "2" pairs show: (1) each process color in the column printed correctly (i.e., "CMYK" set in breakdown 476), (2) the process color printed with cyan omitted in breakdown 478, (3) the process color printed with magenta omitted in breakdown 479, (4) the process color printed with yellow omitted in breakdown 480, (5) or the process color printed with black omitted in breakdown 481. Both breakdowns 475 and 475' include the international symbol for "No" (i.e., "0̸") highlighting process colors that are illegible. With the white background breakdown 475, the international symbol for "No" ("0̸") highlights process colors that fall below the preferred general rule threshold of 25% minimum grayscale (e.g., breakdown 482). However, with the grey background breakdown 475' the international symbol for "No" ("0̸") highlights process colors that fall below the preferred general rule threshold of 25% minimum grayscale, as well as other colors that become illegible given the gray background—e.g., breakdowns 482' and 483'. Colors in both breakdowns without the international symbol for "No" ("0̸") would be considered legible and redundant—e.g., breakdown 483. Of course, as previously discussed, there are other factors that could potentially impact the minimum grayscale threshold for redundancy—e.g., lighting, eyesight, indicium design, substrate smoothness, print quality. The significant concept is to select a minimum grayscale threshold for the game design and its intended use environment for any lottery ticket or other security-enhanced document.

As previously stated, the preferred minimum preferred general rule threshold of 25% minimum grayscale is conservative and dependent on other factors such as background or substrate color. In a specific embodiment, rather than determine an absolute minimum grayscale value for redundantly printed indicia, a method for determining a "contrast delta" between the grayscale equivalent of the underlying substrate surface and a variable grayscale equivalent of the printed variable indicia to maintain redundancy is established. This specific embodiment thereby compensates for optical noise variances introduced by less than optimal underlying substrate surface discoloration and/or low contrast by essentially maintaining a Signal-to-Noise (S/N) ratio sufficiently greater than 1:1 to ensure legibility and consequently the meaning of information represented by the variable indicia in the event that the printing of one or more portions of either or any of the redundantly printed variable indicium malfunctions. However, since the reversed printing percentile notation scale (i.e., a value of 0% denotes pure white and 100% pure black) is preferred for measuring grayscale, a "contrast delta" (i.e., difference or change) will be preferred, rather than a S/N ratio, since the contrast delta is typically more intuitive for most people to understand and inherently avoids possible calculation difficulties—e.g., dividing by zero when determining desired grayscale indicia levels over perfectly white paper (i.e., "0%").

Figure 4J:
FIG. 4J is a front elevation view of representative examples of lottery-type instant ticket indicia with varying gray scale equivalence.

For example, FIG. 4J is a front elevation view of representative examples of lottery-type instant ticket indicia ("$5.00") with gray scale equivalence (484 thru 494) varying from a low 484 of "15%" to a high 494 of "25%" in one percentage increments. As shown in the figure, all eleven indicia (484 thru 494) are illustrated printed over a perfect white background. Thus, the full range of gray scale equivalence indicia (484 thru 494) are legible under these circumstances.

Figure 4K:
FIG. 4K is a front elevation view of a portion of the representative examples of lottery-type instant ticket indicia of FIG. 4J overlaid on top of substrates of varying gray scale equivalence.

However, in FIG. 4K six of the representative examples indicia of FIG. 4J are illustrated overlaid on top of three different substrate backgrounds of varying gray scale equivalence from perfect white or "0%" (484', 485', 486', 489', 492', and 494') to "20%" gray (484''', 485''', 486''', 489''', 492''', and 494'''). When viewed over the ideal perfect white background, all six indicia (484', 485', 486', 489', 492', and 494') are legible, arguably acceptable for most users and environments. However, when the same six gray scale indicia equivalences are overlaid on gray backgrounds of "10%" (484'', 485'' 486'', 489'', 492'', and 494''), the legibility of the lower three gray scale indicia (484'', 485'', and 486'') are questionable at best with only the higher three gray scale indicia (489'', 492'', and 494'') plausibly acceptable. When the same six gray scale indicia equivalences are overlaid on gray backgrounds of "20%" (484''', 485''' 486''', 489''', 492''', and 494'''), the range of plausibly acceptable legibility indicia are arguably eliminated.

Thus, from this example, a contrast delta of 15% would be acceptable for most applications. Consequently, a method for determining the minimum acceptable gray scale equivalence to ensure redundantly printed indicia, would be to first measure the average gray scale equivalence of the background substrate (i.e., the substrate plus any ink films that are deposited on the substrate prior to printing the redundant indicia) to determine the gray scale equivalence substrate noise floor ($S_{nf}$) and then simply add the contrast delta of 15% to $S_{nf}$ to determine the minimum gray scale equivalence level to ensure indicia redundancy ($I_r$), or:

$$I_r = S_{nf} + 15\%$$

The contrast perception of a human will arguably vary dependent on numerous other conditions (e.g., environmental lighting, indicium design, eyesight of the consumer). However, a contrast delta of 15% does provide a baseline for legibility under most conditions. Additionally, incorporating a contrast delta typically negates the effect of substrate noise and consequently provides a variable or floating gray scale equivalence to ensure redundantly printed indicia.

Figure 5:
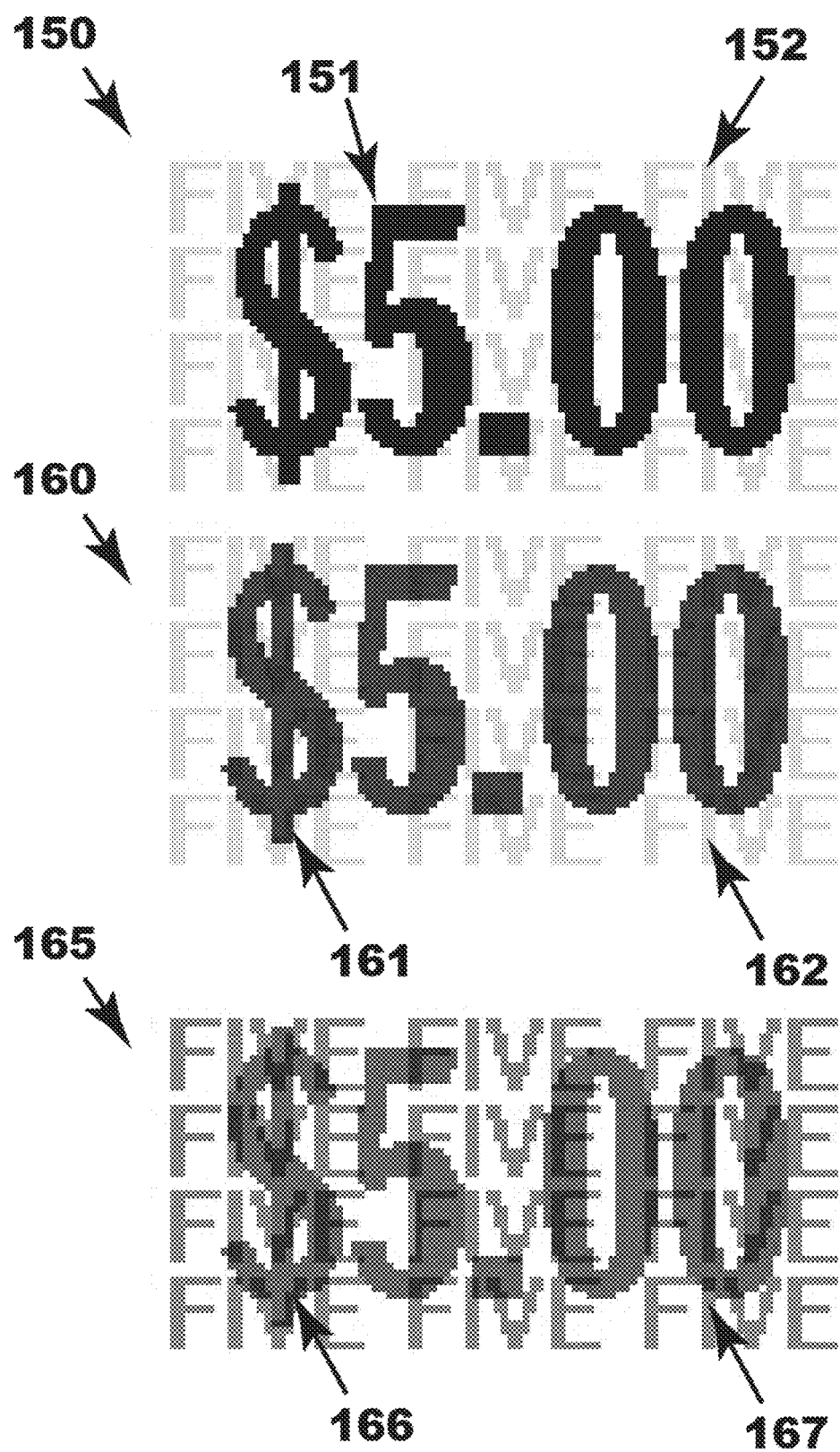
FIG. 5 is a front elevation view of a second representative example of modified lottery-type instant ticket indicia comprised of primary indicia with secondary indicia background including at least one additional color.

FIG. 5 illustrates a second embodiment of a modified lottery-type instant ticket indicia providing three examples of indicia printing redundancy 150, 160, and 165 via different colors employed for primary indicia 151, 161, and 166, respectively, with a secondary associated indicia caption background 152, 162, and 167, respectively, comprised of at least one additional color. As shown in FIG. 5, the primary variable indicia color indicia 151, 161, and 166 can be a spot (i.e., individual) or processed color with the primary variable indicia 151, 161, and 166 varying in darkness or contrast with respect to the secondary variable indicia caption background 152, 162, and 167. This is an example of redundancy of variable indicia, where the same symbol, numeral, word or letters are not overprinted in the same area, but in the same general area containing the variable indicia. As used herein, the term "same general area" means the area of a document to be printed with redundant variable indicia so that the meaning or information imparted to the document by the variable indicia is clear.

Notice that in the embodiments 150, 160, and 165 because of the redundant meaning of the variable indicia, failure of any one color to print in either the primary (numerical) variable indicia or the secondary background (caption) variable indicia would not obfuscate the intended meaning of the indicia in a game. When it is realized that the secondary background (caption) variable indicia 152, 162, 167 is imaged over or under the respective primary variable indicia 151, 161, 166, as is shown in example 165, it becomes apparent that redundancy is maintained even if either the primary or secondary variable indicia fail to print at all. Another advantage of the examples of FIG. 5 is that the combination of the primary and secondary variable indicia may be easier for persons with poor eyesight to read and understand the information imparted by the variable indicia on the ticket. Thus, to maintain redundancy with at least two colors, it is essential that the same information be conveyed with multiple colors or print heads and not utilize multiple colors to convey different information. For example, the prior art illustration of FIG. 1 did incorporate two different imaging colors with red for the key match numbers 101 and 102 and black for the associated values of the key match numbers 101 and 102. However, since the two different colors conveyed different information (i.e., red for key match numbers and black for associated values) the single failure of the red inkjet nozzles to print caused a catastrophic misinterpretation of the intended (i.e., non-winning) information of the misprinted ticket.

Figure 6:
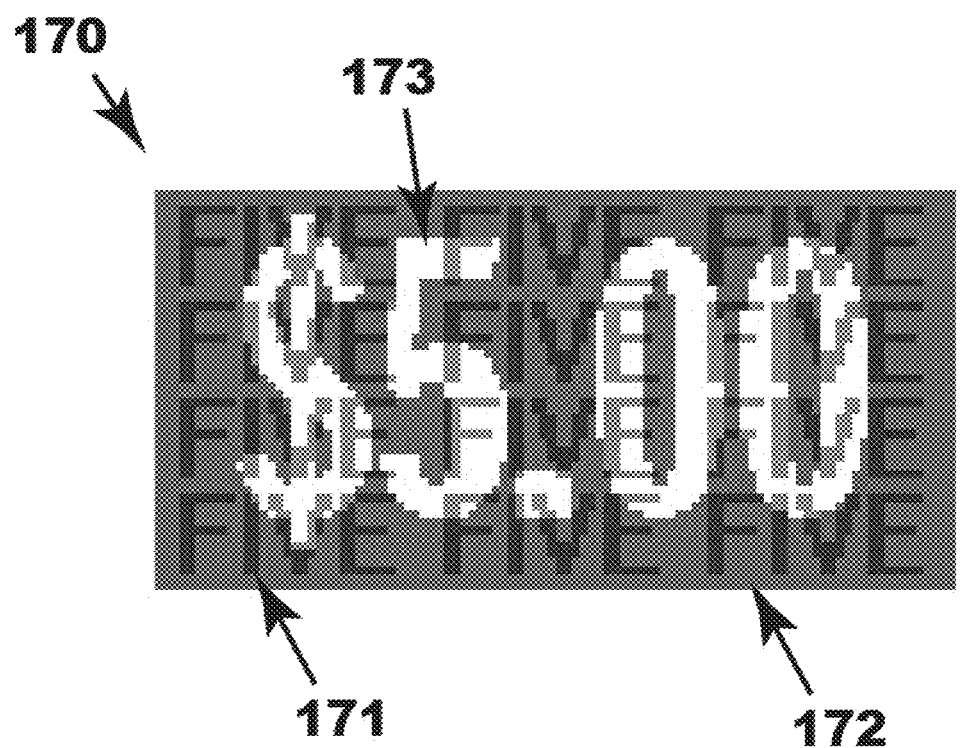
FIG. 6 is a front elevation view of a third representative example of modified lottery-type instant ticket indicia comprised of dual indicia background colors with the primary indicia defined by the absence of an ink film.

FIG. 6 is another embodiment of modified lottery-type instant ticket indicia 170 with printing redundancy achieved via multiple colors. As shown in FIG. 6, redundancy is achieved via two different colors; however, with variable indicia 170 the two different colors or shades that are readily visible when used together are utilized for the secondary caption variable indicia 171 (the caption "FIVE") and a background color or shade 172 (red) with the primary variable indicia 173 (the white "$5.00") defined by the absence of the background color or shade 172. As before, a complete or partial failure of either the caption variable indicia 171 or background color or shade variable indicia 172 would still result in legible overall variable indicia 170 even if the inks of the caption variable indicia 171 and background variable indicia 172 were monochromatic spot colors.

Figure 7:
FIG. 7 is a front elevation view of a fourth representative example of modified lottery-type instant ticket indicia comprised of at least two micro-patterned colors.

FIG. 7 is yet another embodiment of modified lottery-type instant ticket variable indicia 180 or 180' comprised of multiple micro-patterned colors 181 and 182. FIG. 7 is arranged such that the normal size (i.e., non-magnified) appearance of variable indicia 180 is shown, in contrast to a magnified example 180' of the same variable indicia 180. The normal appearance of variable indicia 180 results in an overall grayish color. Only under magnification is it realized that the variable indicia 180' are in fact comprised of red 181 and green 182 colors, here, arranged in adjacent vertical stripes, for example. Again, a partial or complete failure of either red 181 or green 182 colors would still result in legible indicia. This redundancy is maintained if the red 181 and green 182 are spot colors or are process colors—i.e., red (cyan+yellow) and green (magenta+yellow).

Figure 8:
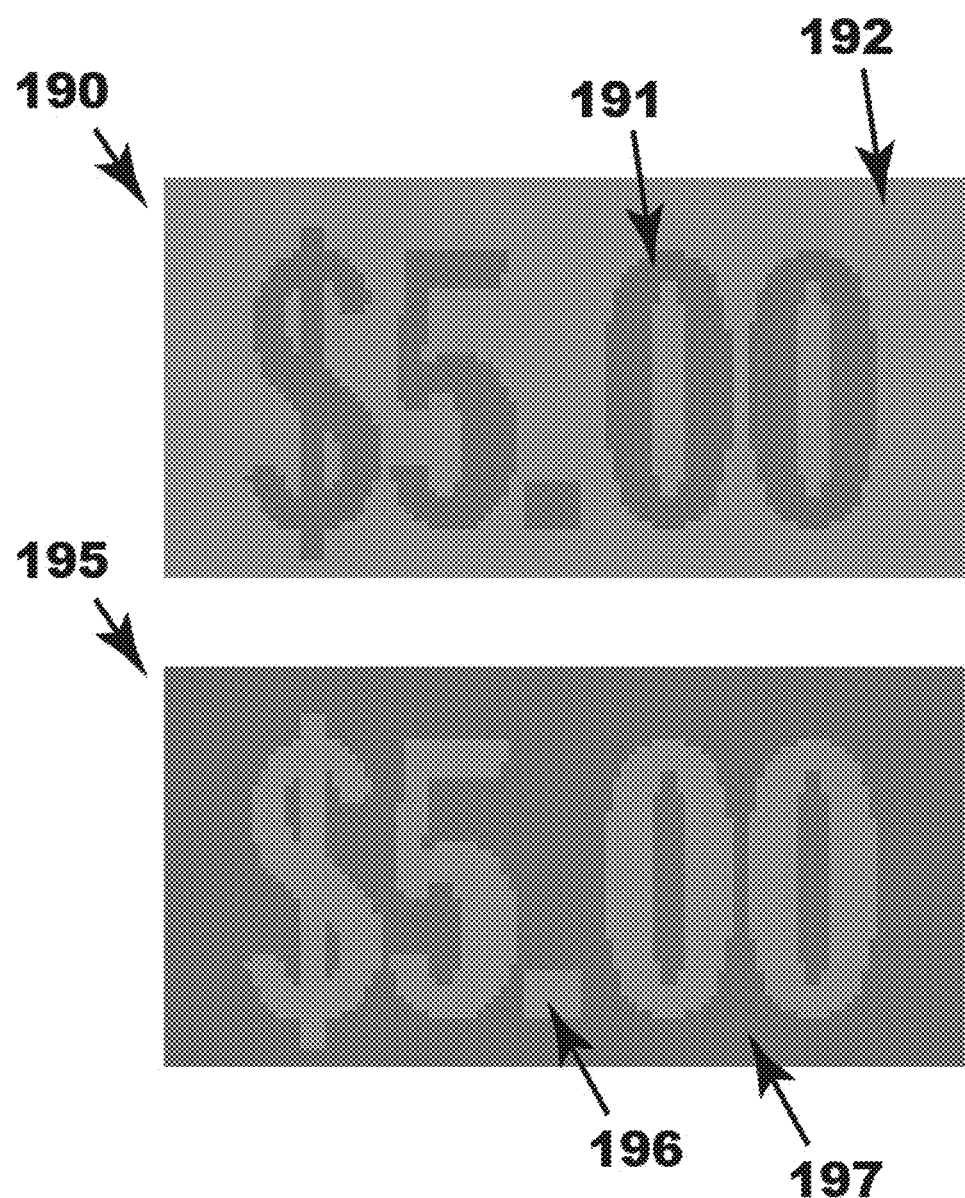
FIG. 8 is a front elevation view of a fifth representative example of a modified lottery-type instant ticket indicia comprised of inverted primary and background indicia colors.

FIG. 8 is a presently preferred embodiment of modified lottery-type instant ticket variable indicia 190 and 195 comprised of inverted primary foreground variable indicia colors 191 or 196, for example showing the "$5.00" information, and background variable indicia colors 192 or 197. As before, a partial or complete failure of either the primary variable indicia colors 191 or 196 or the background variable indicia colors 192 or 197 would still result in legible overall variable indicia 190 and 195.

The relatively low resolution (240 dpi) of and monochromatic nature of existing variable indicia on standard lottery tickets dictates that the fonts for these characters be simple and straightforward so that even consumers with poor eyesight can readily differentiate between different information imparted by the variable indicia. This simplistic representation of information reduces the amount of entropy in the image and therefore makes it possible to more easily identify particular variable indicia with very little visual information, such that microscopic pinprick patterns (where the SOC would appear to be substantially intact to the unaided eye) can enable pick-out of illicit winners, since the pinprick patterns would be more discernible. In the preferred embodiment of FIG. 8, the inversion of the variable indicia 191, 192 and 196, 197 would be pseudo randomly distributed from ticket to ticket such that there is no indication which version (i.e., variable indicia 190 or 195) was imaged on any given unplayed ticket. This pseudorandom distribution of inverted variable indicia provides a countermeasure to pinprick attempts to discern winning tickets without appearing to have the SOC removed. In other words, with the pseudo-random distribution of inverted images on a ticket, any would-be pinprick attacker would not know if any particular pinhole color revealed was the foreground variable indicia 191 or 196 or the associated inverted background variable indicia 192 or 197. This would be true if the primary foreground variable indicia 191 or 196 and background variable indicia 192 or 197 were spot or processed colors.

Figure 9:
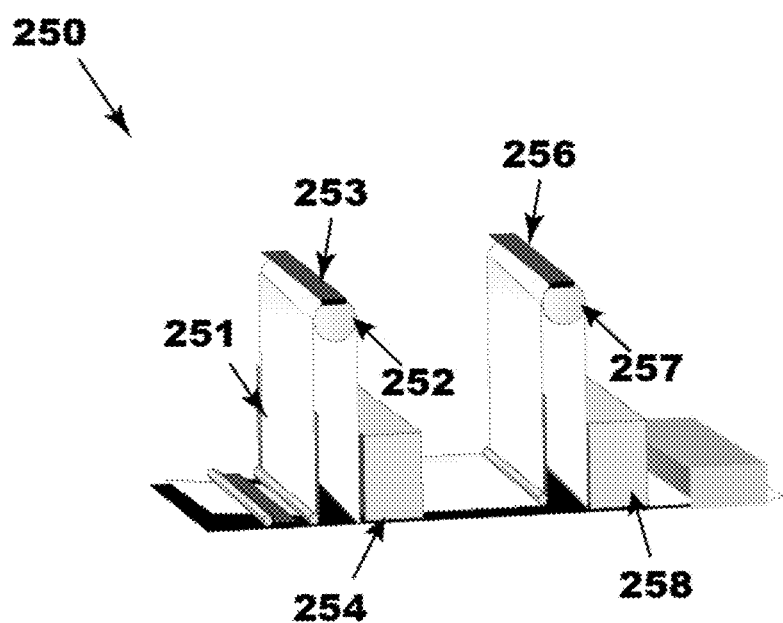
FIG. 9 is a schematic front isometric view of an exemplary embodiment of an inline redundant digital imagers capable of printing the exemplary redundant instant ticket variable indicia of FIG. 4 through FIG. 8; and, FIG. 10 is a schematic front isometric view of an exemplary embodiment of multiple digital imagers sharing a common offset drum capable of producing the redundant instant ticket variable indicia of FIG. 4 through FIG. 8.

One possible press configuration 250 capable of producing the redundant variable indicia embodiments of FIG. 4 through FIG. 8 is illustrated in FIG. 9. As illustrated in FIG. 9, press configuration 250 shows two redundant print heads (e.g., inkjet) 253 and 256 inline and registered on the same web 251 feed. Web 251 is pulled over rollers 252 and 257 to ensure correct positioning and registration for the redundant print heads 253 and 256 (respectively) with the web immediately routed through driers 254 and 258 after each print head (253 and 256 respectively) to ensure the printed variable indicia does not smear before contacting a press roller on the same side of the web. Press configuration 250 is representative of incorporating multicolor redundancy with printed variable indicia using drop on demand inkjet technology typically used for producing instant lottery tickets.

Figure 10:
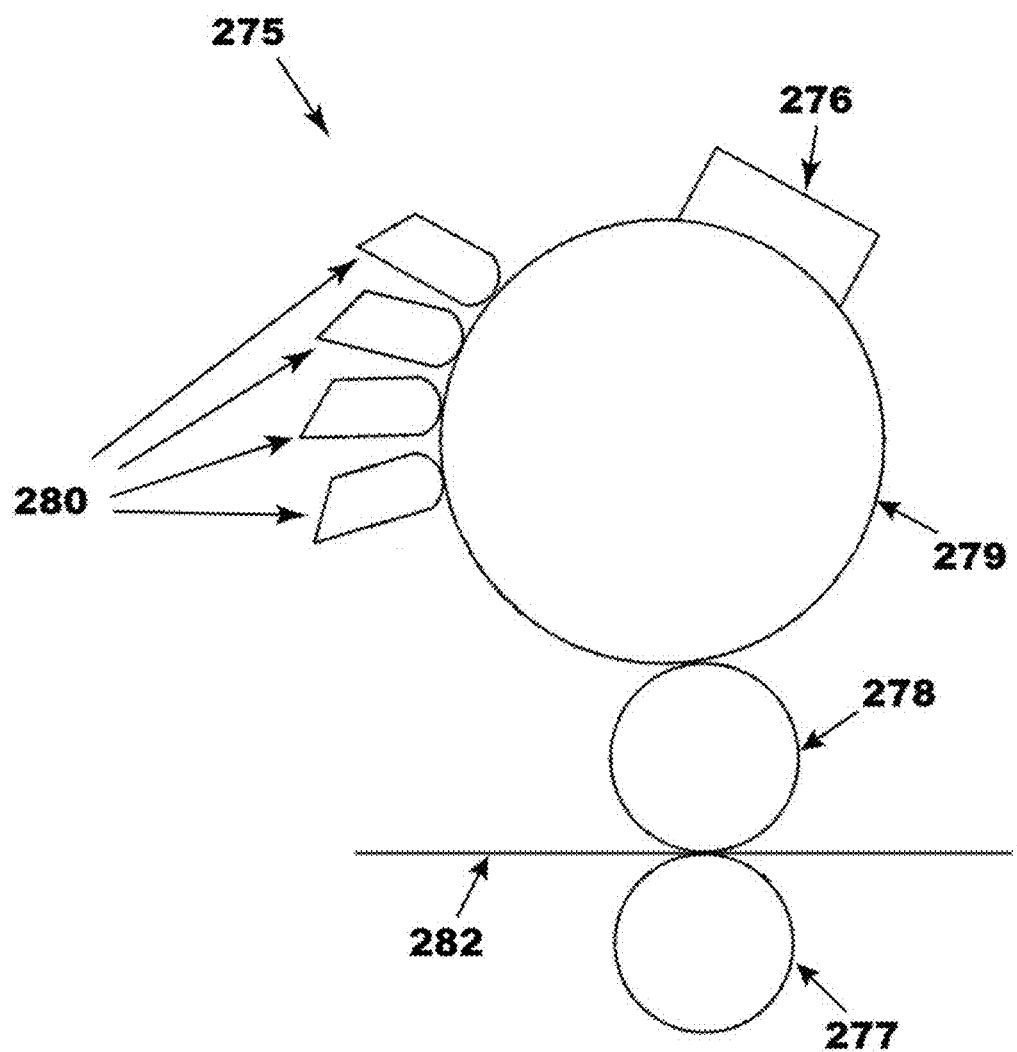

A different press configuration 275 is illustrated in FIG. 10 illustrating utilizing multiple print heads 280 to print redundant variable indicia via an offset printing process. As illustrated in FIG. 10, four separate print heads 280 for each of the (CMYK) process colors apply ink to a rotating photo imaging cylinder 279 where the desired variable indicia are initially formed. Also, typically in contact with the photo imaging cylinder is a photo charging unit 276 that applies a charge to portions of the photo imaging cylinder which correspond to areas desired for the variable indicia. The charged portions of the photo imaging cylinder 279 attract the ink and form the desired variable indicia pattern on the photo imaging cylinder 279 for each color in a sequential process. This variable indicia ink pattern is then transferred to the blanket cylinder 278 where the process is repeated until all colors are transferred to the web substrate 282 via the impression roller 277 forcing contact of the substrate to the blanket cylinder 278. Thus, redundant variable indicia ink applications are imaged via a common photo imaging cylinder 279 and associated blanket cylinder 278 with no requirements for the web to travel to separate print heads positioned in different locations in the path of web motion.

Of course, all press configuration embodiments must ensure that sufficient registration is maintained between multiple ink or dye applications such that the redundantly printed variable indicia appear to be one coherent object to the human eye. Thus, it is essential that registration be maintained between the various applications of redundant indicia, preferably to between 1 and ½ print dot.

Of course, there are other variations of the disclosed embodiments (e.g., process color indicia images comprised of a balance of at least two different colors, etc.) that would be apparent to anyone skilled in the art in view of the present disclosure, and would be within the parameters of the appended claims.

What is claimed is:

1. A redundantly printed security-enhanced document comprising:
   a substrate having a surface; and
   variable indicia representing variable information, the variable indicia comprising a first variable indicium and a second variable indicium printed on a common area of the surface of the substrate,
      the first variable indicium comprising a first component color,
      the second variable indicium comprising a different second component color,
      each of the first and second component colors having a grayscale equivalent level equal to or greater than a grayscale equivalent level of the surface of the substrate plus an additional contrast delta of at least 15%,
      the first and second component colors printed in register to form a common process color indicum on the surface on the substrate, the common process color indicum having a grayscale equivalent level equal to or greater than the grayscale equivalent level of the surface of the substrate plus the additional contrast delta, and
      such that each of the first and second component colors printed on the common area by itself indicates the same variable information represented by the variable indicia.

2. The redundantly printed security-enhanced document of claim 1, wherein the first and second component colors each comprise either cyan, magenta, yellow, or black.

3. The redundantly printed security-enhanced document of claim 1, wherein the first and second component colors comprise spot colors.

4. The redundantly printed security-enhanced document of claim 1, wherein the variable information comprises an intended value of the redundantly printed security-enhanced document.

5. The redundantly printed security-enhanced document of claim 1, wherein the variable indicia comprise an alphanumeric character.

6. The redundantly printed security-enhanced document of claim 1, wherein the variable indicia comprise an icon or a figure.

7. A redundantly printed security-enhanced document comprising:
- a substrate having a surface; and
- variable indicia representing variable information, the variable indicia comprising a first color and a different second color printed on adjacent areas of the same surface of the substrate,
  - the first and second colors having a grayscale equivalent level relative to the substrate with a contrast delta of at least 15% grayscale equivalent,
  - the first and second colors printed in register forming a color indicum and an associated background, and
  - such that each of the color indicum and the associated background by itself indicates the same variable information represented by the variable indicia.

8. The redundantly printed security-enhanced document of claim 7, wherein the first or second colors are process colors.

9. The redundantly printed security-enhanced document of claim 8, wherein the first or second colors comprise a combination of cyan, magenta, yellow, or black.

10. The redundantly printed security-enhanced document of claim 7, wherein the first or second colors are spot colors.

11. The redundantly printed security-enhanced document of claim 7, which is one of a plurality of redundantly printed security-enhanced documents, and wherein for at least two of the redundantly printed security-enhanced documents, the first and second colors are inverted.

12. The redundantly printed security-enhanced document of claim 7, which is one of a plurality of redundantly printed security-enhanced documents, wherein the first and second spot or process colors are inverted base on a random determination for the plurality of redundantly printed security-enhanced documents.

13. A redundantly printed security-enhanced document comprising:
- a substrate having a surface; and
- variable indicia representing variable information, the variable indicia comprising a first color and a different second color that are printed on adjacent areas of the same surface of the substrate, and
  - each of the first and second colors having a grayscale equivalent level relative to the substrate with a contrast delta of at least 25% grayscale equivalent, the first and second colors forming a color indicum and an associated background,
  - such that each of the color indicum and the associated background by itself indicates the same variable information represented by the variable indicia.

14. The redundantly printed security-enhanced document of claim 13, wherein the first or second colors are process colors.

15. The redundantly printed security-enhanced document of claim 14, wherein the first or second colors comprise a combination of cyan, magenta, yellow, or black.

16. The redundantly printed security-enhanced document of claim 13, wherein the first or second colors are spot colors.

17. The redundantly printed security-enhanced document of claim 13, which is one of a plurality of redundantly printed security-enhanced documents, and wherein for at least two of the redundantly printed security-enhanced documents, the first and second colors are inverted.

18. The redundantly printed security-enhanced document of claim 13, which is one of a plurality of redundantly printed security-enhanced documents, wherein the first and second colors are inverted based on a random determination for the plurality of redundantly printed security-enhanced documents.

19. The redundantly printed security-enhanced document of claim 13, wherein the variable indicia comprise an alpha-numeric character.

20. The redundantly printed security-enhanced document of claim 13, wherein the variable indicia comprise an icon or a figure.

* * * * *